(12) United States Patent
Nakagawa et al.

(10) Patent No.: US 7,747,799 B2
(45) Date of Patent: Jun. 29, 2010

(54) STORAGE SYSTEM

(75) Inventors: Yutaka Nakagawa, Yokohama (JP); Masahiro Arai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 12/123,148

(22) Filed: May 19, 2008

(65) Prior Publication Data
US 2008/0288678 A1 Nov. 20, 2008

Related U.S. Application Data

(63) Continuation of application No. 11/129,552, filed on May 16, 2005, now abandoned.

(30) Foreign Application Priority Data

Mar. 16, 2005 (JP) ............................ 2005-074375

(51) Int. Cl.
G06F 7/00 (2006.01)
(52) U.S. Cl. ................. 710/68; 710/33; 711/1
(58) Field of Classification Search ............... None
See application file for complete search history.

(56) References Cited

U.S. PATENT DOCUMENTS

| | | | | |
|---|---|---|---|---|
| 5,410,671 A * | 4/1995 | Elgamal et al. | ............ | 711/202 |
| 5,555,389 A | 9/1996 | Satoh et al. | | |
| 5,623,701 A * | 4/1997 | Bakke et al. | ............ | 710/68 |
| 5,649,152 A | 7/1997 | Ohran et al. | | |
| 5,812,817 A * | 9/1998 | Hovis et al. | ............ | 711/173 |
| 5,819,292 A | 10/1998 | Hitz et al. | | |
| 6,374,266 B1 * | 4/2002 | Shnelvar | ............ | 707/204 |
| 6,757,699 B2 * | 6/2004 | Lowry | ............ | 707/205 |
| 6,956,507 B2 * | 10/2005 | Castelli et al. | ............ | 341/50 |
| 7,127,619 B2 * | 10/2006 | Unger et al. | ............ | 713/193 |
| 7,302,543 B2 * | 11/2007 | Lekatsas et al. | ............ | 711/170 |
| 7,428,642 B2 * | 9/2008 | Osaki | ............ | 713/189 |
| 7,474,750 B2 * | 1/2009 | Lekatsas et al. | ............ | 380/269 |
| 7,558,968 B2 * | 7/2009 | Sakaguchi | ............ | 713/189 |
| 2004/0003103 A1* | 1/2004 | Witt et al. | ............ | 709/231 |

FOREIGN PATENT DOCUMENTS

| | | |
|---|---|---|
| JP | 7-72981 | 3/1995 |
| JP | 8-511367 | 11/1996 |
| WO | WO 94/29807 | 12/1994 |

* cited by examiner

*Primary Examiner*—Henry W. H. Tsai
*Assistant Examiner*—Cheng-Yuan Tseng
(74) *Attorney, Agent, or Firm*—Antonelli, Terry, Stout & Kraus, LLP.

(57) ABSTRACT

Data transfer is performed to and from a host computer using a first block as the minimum unit. Data transfer is performed to and from a storage area using a second block as the minimum unit. A second block set of the storage area stores data obtained from performing data conversion processes that change the size of the data itself, with a first block set as the unit. Here a correspondence relationship is generated between the first block set and the second block set. In response to a read request from the host computer, a second block set, which corresponds to the first block set that includes the first block that is requested, is read, a reverse-conversion process is performed, and the data is sent to the host computer.

10 Claims, 20 Drawing Sheets

Fig.6(A)

Compressed LBA Control Table 500

| | Pre-migration (Pre-compression) | | Post-migration (Post-compression) | | | |
|---|---|---|---|---|---|---|
| | Starting LBA | Size | Starting LBA | Size | Compressed (C) Non-compressed (N) | |
| BS1 → | 0000 | 10 | 0000 | 10 | N | ← BS11 |
| | ⋮ | ⋮ | ⋮ | ⋮ | ⋮ | |
| BS2 → | 3000 | 10 | 3000 | 10 | N | ← BS12 |
| BS3 → | 3010 | 10 | 3010 | 06 | C | ← BS13c |
| BS4 → | 3020 | 10 | 3016 | 07 | C | ← BS14c |
| | ⋮ | ⋮ | ⋮ | ⋮ | ⋮ | |
| BS5 → | 7990 | 10 | 5808 | 05 | C | ← BS15c |

Fig.6(B)

Volume Status Control Table 520

| LDEVN | Compression | Encryption | Algorithm |
|---|---|---|---|
| 0 | Disabled | Disabled | – |
| 1 | Enabled | Disabled | LHA |
| 2 | Enabled | Disabled | ZIP |
| 3 | Disabled | Enabled | DES |
| ⋮ | ⋮ | ⋮ | ⋮ |

Fig.6(C)

Logical Volume Control Table 510

| LUN | LDEVN |
|---|---|
| 0 | ̶0̶ → 1 |
| 1 | 4 |
| ⋮ | ⋮ |

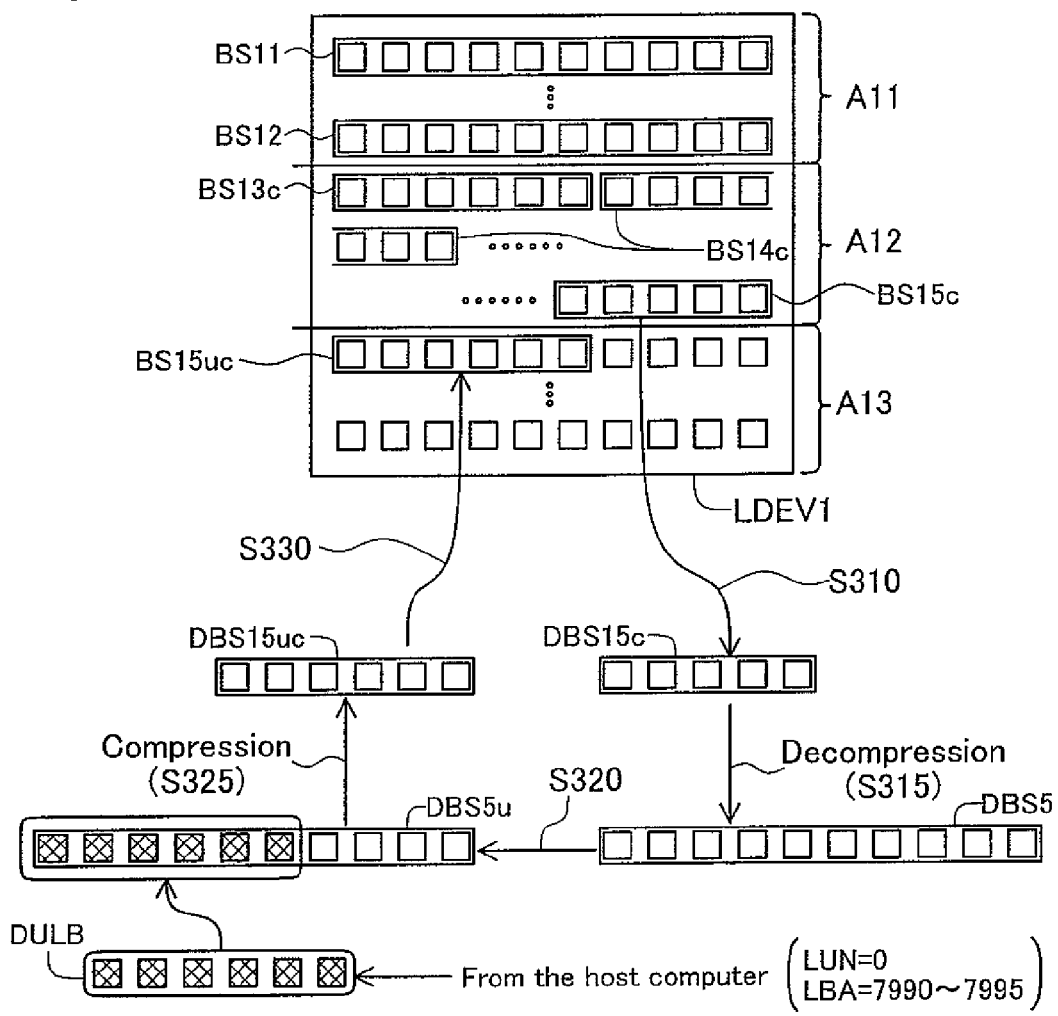

Step S2

Step S2

Update Status Control Table 530

BS100 →

| Starting LBA (h) | Ending LBA (h) | Backup Information |
|---|---|---|
| 00000 | 000FF | Pointer |
| ⋮ | ⋮ | ⋮ |

Generation/Compression Control Table 540

BS200c →

| Generation | Starting LBA (h) | Ending LBA (h) | Other generation information |
|---|---|---|---|
| 0 | 00000 | 00050 | None |
| ⋮ | ⋮ | ⋮ | ⋮ |

Step S5

Update Status Control Table 530

BS100 →

| Starting LBA (h) | Ending LBA (h) | Backup Information |
|---|---|---|
| 00000 | 000FF | Pointer |
| ⋮ | ⋮ | ⋮ |

Generation/Compression Control Table 540

| Generation | Starting LBA (h) | Ending LBA (h) | Other generation information |
|---|---|---|---|
| 0 | 00000 | 00050 | Pointer |
| 12 | 00051 | 000BF | None |
| ⋮ | ⋮ | ⋮ | ⋮ |

BS200c →
BS210c →

Case A (Step S7)

Case B (Update the second generation "00300" after step S7)

Case C (Update the first generation "00100" after step S7)

STORAGE SYSTEM

CROSS-REFERENCE TO RELATED APPLICATIONS

This is a continuation of U.S. application Ser. No. 11/129,552, filed May 16, 2005 now abandoned. This application relates to and claims priority from Japanese Patent Application No. 2005-074375, filed on Mar. 16, 2005. The entirety of the contents and subject matter of all of the above is incorporated herein by reference.

BACKGROUND OF THE INVENTION

1. Field of the Invention

The present invention relates to storage systems that provide data storage areas to host computers.

2. Description of the Related Art

In recent years storage systems that provide data storage areas to host computers have become more common. When this type of storage system is used, the host computer does not merely store the application data to the storage system. But rather the host computer additionally performs a variety of data processes. For example, the host computer additionally performs compressing the data, storing the compressed data to the storage system, and controlling the compressed data. In another example, the host computer performs storing backup data to the storage system, and controlling the backup data that has been stored. (See, for example, U.S. Pat. Nos. 5,649,152, 5,555,389, and JP7-72981A.)

However, sometimes performing these processes increases the load on the host computer. In particular, when compressing data files for storage or controlling the locations of the compressed data, the increase in the overhead on the host computer has been remarkable.

Note that this type of problem is not limited to cases wherein data compression processes are performed, but rather the problem is the same in cases wherein, for example, data encryption processes are performed, or when data processes are performed when the size of the data itself is changed.

SUMMARY OF THE INVENTION

An object of the present invention is to provide a technology to reduce the overhead on the host computer through the use of a storage system that stores data after data processing that changes the size of the data.

In an aspect of the present invention, there is provided a storage system for providing a storage area that stores data to a host computer. The storage system has a data storage unit having a storage area for storing data, and a control unit configured to control data transfer between the host computer and the storage area. The control unit performs: receiving data from and sending data to the host computer according to a logical storage location expressed in units of first blocks of a specific size, the logical storage location being specified by the host computer; and storing data to and reading data from the storage area in units of second blocks of a specific size. And the control unit has a conversion storage mode for performing a data conversion process on data of interest for each first block set in the data-of-interest to generate a second block set corresponding to each first block set, and storing the second block set in the storage area, the data conversion process changing size of the data of interest, the first block set including N first blocks where N is an integer greater than or equal to 1, the second block set including one or more second blocks. And wherein the storage system further has a correspondence relationship memory unit configured to store a block correspondence relationship that indicates correspondence relationship between a plurality of the first block sets and a plurality of the second block sets. When the control unit has received a data read request for a specific first block from the host computer, the control unit executes: referencing the block correspondence relationship to identify a second block set to be read associated with a particular first block set that includes the requested first block; reading out the second block set to be read; performing a reverse conversion process of the data conversion process on the readout second block set; and sending data of the requested first block to the host computer.

Given this storage system, the correspondence relationship memory unit stores the block correspondence relationships that indicate the correspondence relationships of the block sets before and after the data conversion processing, and the control unit, in response to a read request from the host computer, references the block correspondence relationships to read out the data from after the conversion processing from the storage area, and performs the reverse conversion process for the data that has been read out, and sends the requested data to the host computer, using the data that has been obtained, thus making it possible to reduce the load on the host computer through the use of a storage system that stores the data after the data processing that changes the size of the data itself has been performed.

Note that the present invention may be implemented in a variety of forms; for example, embodied in the form of a method and a device that provide a storage area, embodied in the form of a computer program for executing the functions of such method and device, embodied in the form of a recording medium on which is recorded this computer program, or embodied in a form of a data signal embodied in a carrier wave that includes this computer programs.

These and other objects, features, aspects, and advantages of the present invention will become more apparent from the following detailed description of the preferred embodiments with the accompanying drawings.

BRIEF DESCRIPTION OF THE DRAWINGS

FIGS. 6(A)-6(C) are drawings showing one example of tables 500, 510, and 520;

FIG. 10 is a drawing showing an overview of the write process;

FIG. 11 is a drawing showing one example of the post-update compressed LBA control table 500;

DESCRIPTION OF THE PREFERRED EMBODIMENT

Next, embodiments of the present invention will be explained based on examples in the following sequence:
A. First embodiment
B. Second embodiment
C. Third embodiment
D. Variants

A. First Embodiment

A1. Structure of the Device

Figure 1:
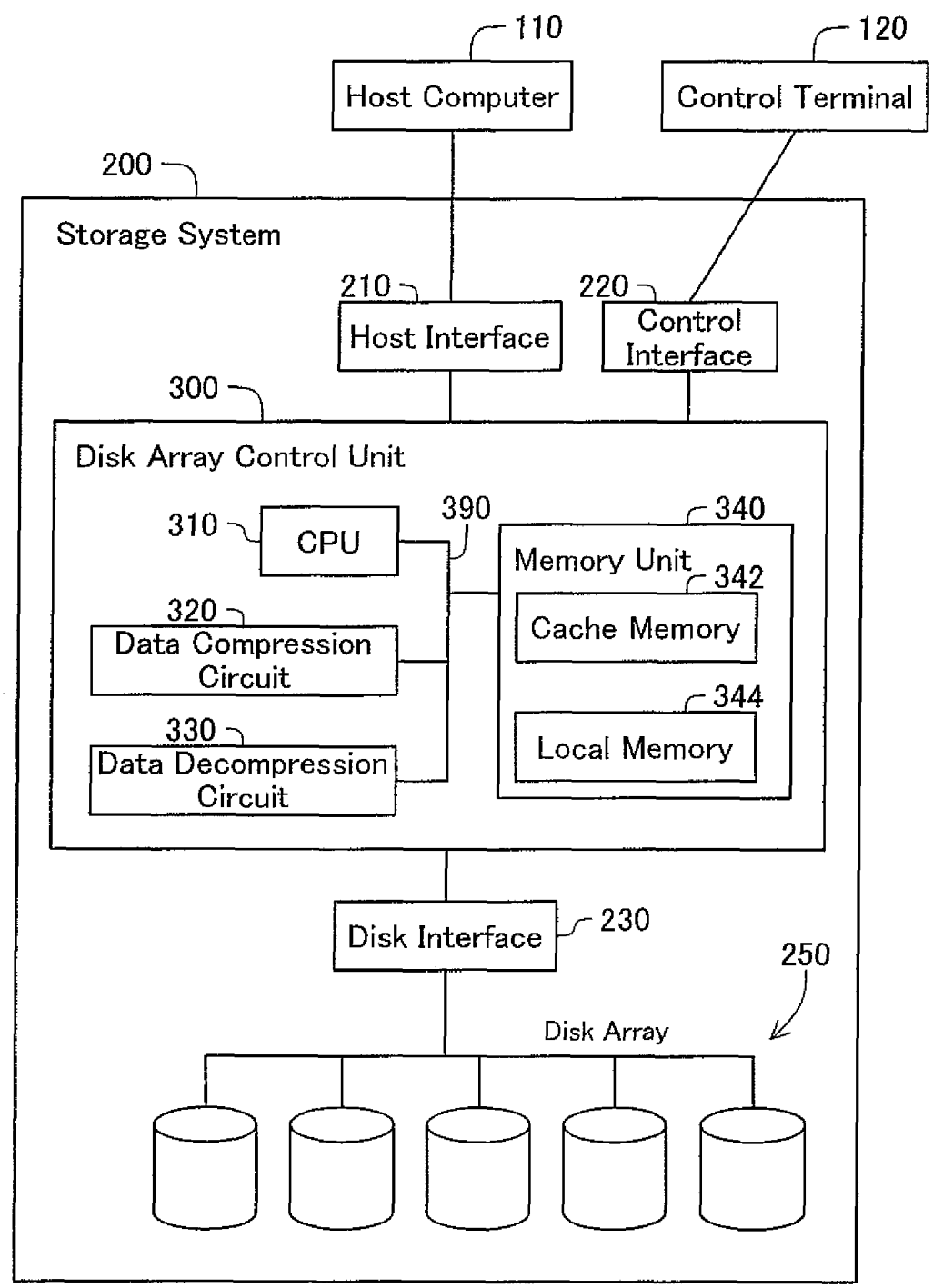
FIG. 1 is a drawing of the structure of a storage system as a first embodiment according to the present invention.

FIG. 1 is a drawing showing the structure of a storage system as a first embodiment according to the present invention. This storage system 200 has a host interface 210, a control interface 220, a disk interface 230, a disk array control unit 300 connected to each of the interfaces 210, 220, and 230, and a disk array 250 that is connected to the disk interface 230. The disk array 250 has a plurality of disk devices.

The host interface 210 is connected to a host computer 110. This host computer 110 uses the data storage area provided by the storage system 200, and achieves specific functions. As functions of the host computer 110, there are, for example, functions as a file server to provide data files to a client device (not shown), and functions as a database server to control a variety of data.

The control interface 220 is connected to a control terminal 120. An administrator (operator) of the storage system 200 can control operational settings of the storage system 200 by operating this control terminal 120.

The disk array control unit 300 has a CPU 310, a data compression circuit 320, a data decompression circuit 330, and a memory unit 340. All of the structural elements are connected to each other through a bus 390. Moreover, the memory unit 340 has a cache memory 342 and a local memory 344. The cache memory 342 stores, temporarily, the data that is sent between the disk array 250 and the host computer 110. Moreover, the local memory 344 stores the data and programs used when the CPU 310 performs a variety of data processes (described below).

Figure 2:
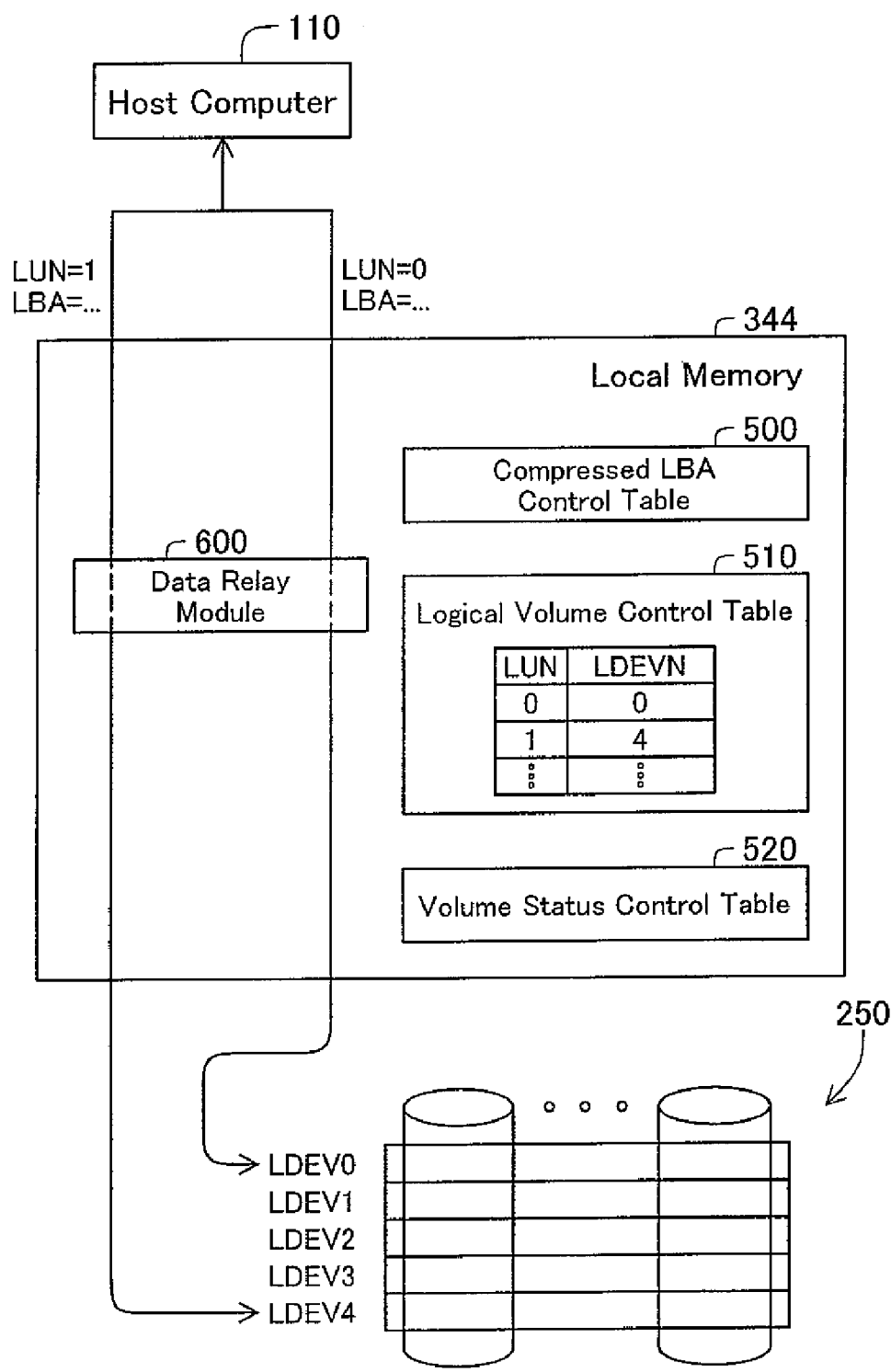
FIG. 2 is a schematic diagram showing the internal structure of a local memory 344.

FIG. 2 is a schematic diagram showing the internal structure of the local memory 344. The local memory 344 has a compressed LBA control table 500, a logical volume control table 310, a volume status control table 520, and a data relay module 600. The data relay module 600 has a function that relays data transmissions between the host computer 110 and the disk array 250 (described in detail below). The functions of the data relay module 600 are achieved by a computer program executed by the CPU 310 (FIG. 1).

Moreover, the data relay module 600 configures a RAID (Redundant Array of Inexpensive Disks) system that uses the disk array 250. In FIG. 2, the data relay module 600 forms five logical volumes LDEV0 through LDEV4 by configuring a RAID system.

Here a logical volume is a data storage area that includes a plurality of logical blocks. A logical block is the smallest unit for data transmission to or from the logical volume. In the first embodiment, the data sizes in the logical blocks are identical for each of the logical volumes LDEV0 through LDEV4. A logical block within one logical volume is identified by a unique logical block address (hereinafter termed "LBA") for each of the logical blocks. In the first embodiment, serial numbers, starting with "0" are used for the LBAs. The data relay module 600 specifies a logical block to be accessed by using the LBA. In the below, a logical volume may be referred to as a "logical device," or simple a "volume." Moreover, a logical block may be referred to simply as a "block." Moreover, the data relay module 600, in order to identify each of the logical volumes, assigns a unique number (hereinafter termed the "LDEVN") to each of the logical volumes (logical devices). In FIG. 2, each of the five logical volumes are assigned numbers 0 through 4, respectively.

Moreover, the data relay module 600 selectively causes the logical volumes to be used by the host computer 110. In FIG. 2, the data relay module 600 provides two logical volumes LDEV0 and LDEV4 to the host computer 110. The logical volumes that can be used by the host computer 110 in this way are termed the "logical units." The data relay module 600 assigns a unique logical unit number (hereinafter termed "LUN") to each of the logical units. In the example shown in FIG. 2, the 0th logical volume LDEV0 is assigned "No. 0," and the fourth logical volume LDEV4 is assigned "No. 1." This type of correspondence relationship between the LUNs and the LDEVNs is stored in the logical volume control table 510.

In the first embodiment, the minimum unit for data transfer between the host computer 110 and the data relay module 600 is the logical block, which is the same as the minimum unit (the logical block) for data transfer between the data relay module 600 and the logical volume. The host computer 110 requests data transfer to/from a logical unit by specifying the LUN and the LBA. The data relay module 600 relays the data transfer for a logical volume according to a request from the host computer 110. However, as will be explained below, in the first embodiment, the data to be stored in multiple logical blocks is gathered together, compressed, and stored in smaller logical blocks. Consequently, there are cases wherein the LBA specified by the host computer 110 will be different from the LBA of the actual logical block that is used in the data transfer. In this way, the correspondence relationship between the specified LBA and the actual LBA is stored in the compressed LBA control table 500 (explained in detail below). The LBA specified by the host computer 110 is called the "specified LBA."

A2. Compression Process

Figure 3:
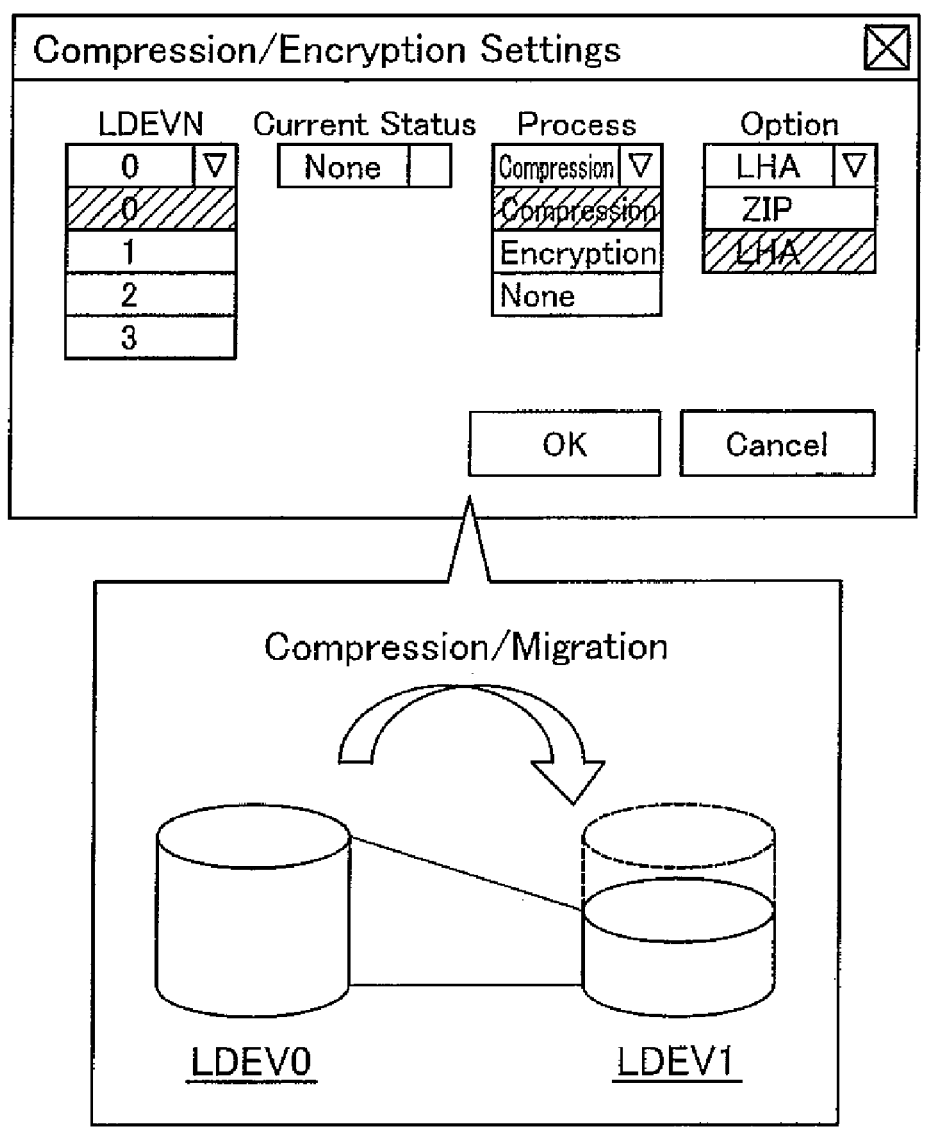
FIG. 3 is a figure showing one example of a set up screen displayed on a control terminal 120.

FIG. 3 is an explanatory figure showing one example of a setup screen displayed on a control terminal 120. This setup screen is a setup screen for performing the compression/migration of the logical volume. "Compression/migration" refers to the process for compressing the data that has been stored on a logical volume, and then re-storing. In the first embodiment, all of the data for a first logical volume is compressed, and migrated to another logical volume. The operator, by operating the setup screen shown in FIG. 3, is able to select the logical volume that will be processed (the migration origin), the contents to be processed, and the processing algorithm. In FIG. 3, the "0th logical volume LDEV0" is selected. "Compression" is selected as the process to be performed at the time of migration, and "LHA" is selected as the algorithm for the compression process. "Encryption" may also be selected instead of "compression" as the process to be performed at the time migration, and described below. "ZIP" can also be selected instead of "LHA" as the algorithm for the compression process. When the operator activates the "OK" button, the disk array control unit 300 (FIG. 1) commences the compression/migration process. Note that the data relay module 600 selects automatically an empty logical volume to be the logical volume for the migration destination. In FIG. 3, the first logical volume LDEV1 is selected as the migration destination. Note also that this selection may be made by the operator.

Figure 4:
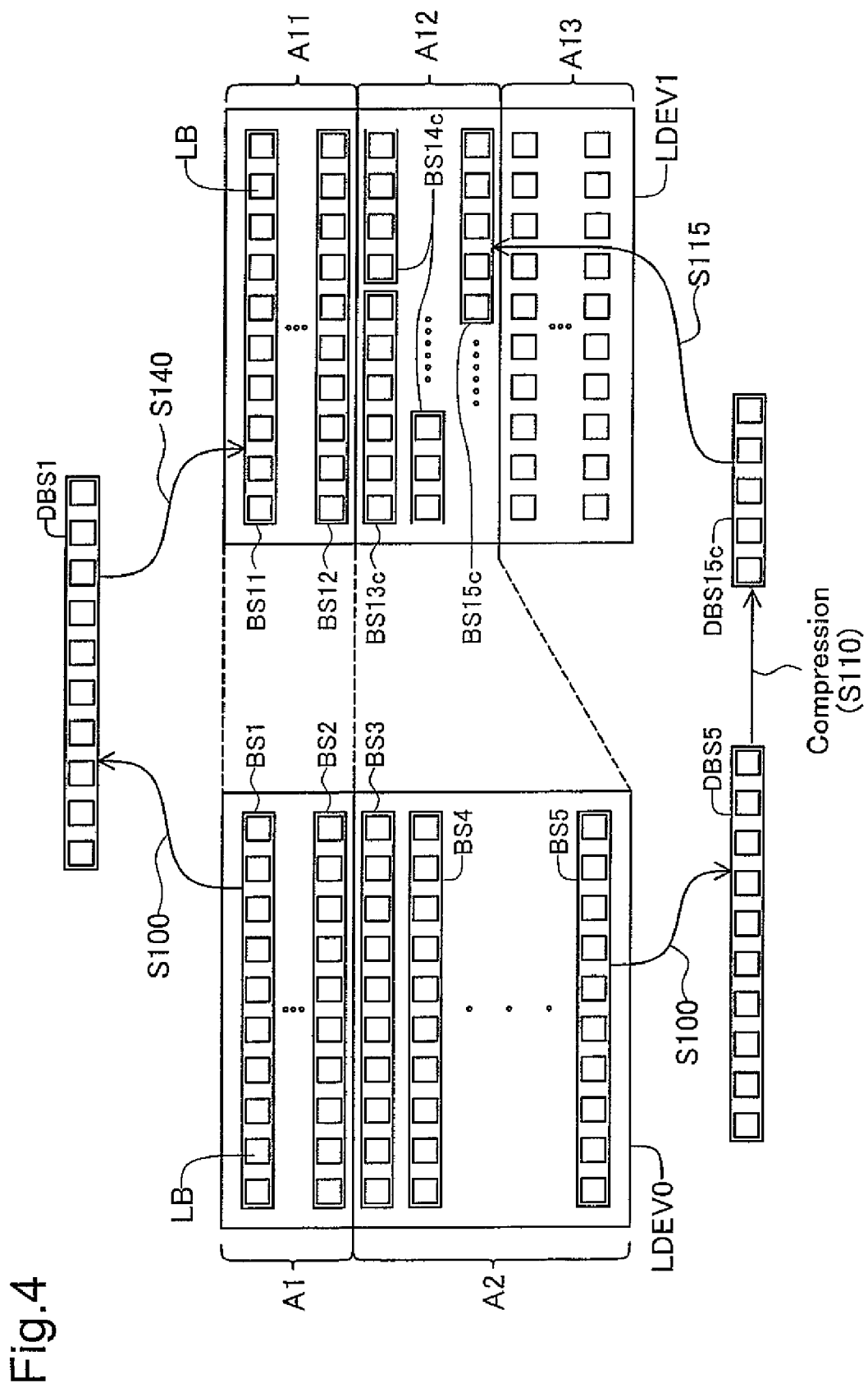
FIG. 4 is a drawing showing the overview of the compression/migration process.

FIG. 4 is a diagram showing an overview of the compression/migration process. FIG. 4 shows the 0th logical volume LDEV0 and the first logical volume LDEV1. Each of these logical volumes LDEV0 and LDEV1 has a plurality of logical blocks LB.

The 0th logical volume LDEV0 is partitioned into a non-compressed area A1 and a compressed area A2. These partitions are set up in advance. Moreover, the correspondence relationship between each of the logical blocks and each area is stored in advance in the local memory 344. For example, when a file system is structured in a logical volume, the logical volume may be partitioned into a data area, wherein data files are stored, and a control area, wherein information for controlling the data files (such as the correspondence relationships between the file names and the LBAs) is stored. In such a case, the control area is set up in the non-compressed area A1, and the data area is set up in the compressed area A2. Typically the part of the area wherein is stored data that is accessed relatively frequently should be used as the non-compressed area A1, and the part of the area wherein is stored data that is accessed relatively infrequently should be used as the compressed area A2. Additionally, all areas of a logical volume may be used as compressed areas. Note that the operator may set up such areas.

Figure 5:
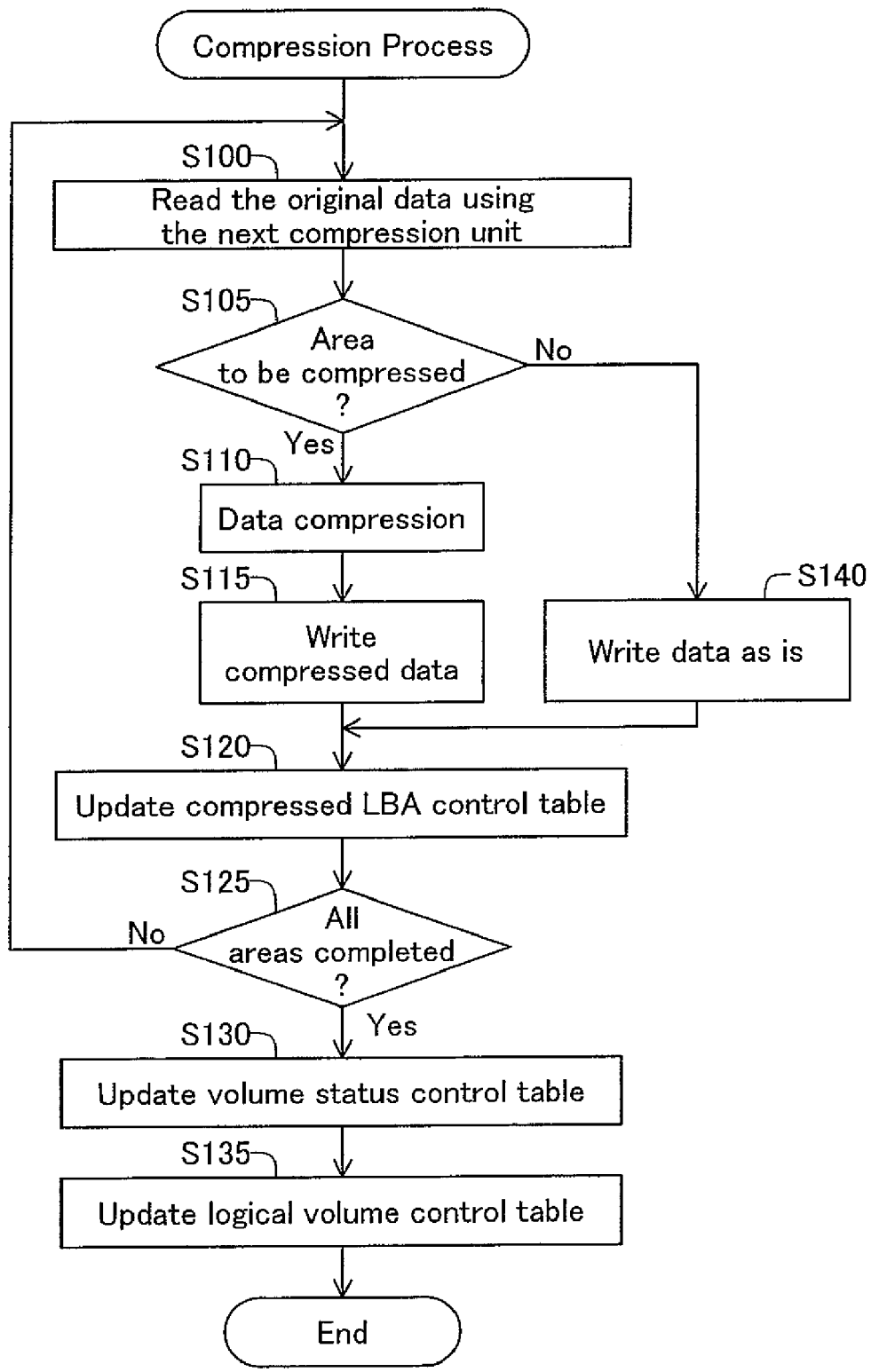
FIG. 5 is a flowchart showing the procedures for the compression/migration process.

FIG. 5 is a flow chart showing the procedures for the compression/migration process. The data relay module 600 (FIG. 2) migrates data, in compression units, sequentially from the front (from the side wherein the LBA is the lowest). In the first embodiment, the compression unit is a block set comprising ten logical blocks with sequential LBAs. The logical volume LDEV0 is partitioned into multiple block sets.

First the procedures will be explained for the case wherein data is migrated within the non-compressed area A1. In Step S100, the data relay module 600 reads out the data from one block set within the migration origin logical volume LDEV0. In the example shown at the top of FIG. 4, the data relay module 600 reads out the data DBS1 from the first block set BS1 within the non-compressed area A1.

In the next Step S105, the data relay module 600 determines whether or not the read origin block set is within the compressed area A2. In the example at the top of FIG. 4, the first block set BS1 is in the non-compressed area A1. Consequently, the data relay module 600 moves to Step S140. In Step S140, the data relay module 600 stores as is the data that has been read out, storing this data to the migration destination logical volume LDEV1. Here the "stores as is" means that the contents of the data are stored without modification. At this time, the data relay module 600 selects the migration destination logical blocks sequentially from the front (from the side wherein the LBA is the lowest). In FIG. 4, the data DBS1 is stored to the first block set BS11. Each block set BS1 and BS11 has the same number of logical blocks.

In the next step, S120, the data relay module 600 updates the compressed LBA control table 500. FIG. 6 (A) is a figure showing an example of the compressed LBA control table 500. The compressed LBA control table 500 stores the correspondence relationships between the pairs of block sets before and after migration, and information regarding whether or not compression was performed at the time of migration. In the example in FIG. 6 (A), the block set is specified by a combination of the starting LBA and the size (number of blocks). The data relay module 600 stores in the compressed LBA control table 500 the correspondence relationship between the first block set BS1 prior to migration and the first block set BS11 after migration. In FIG. 6 (A), the starting LBA for the first block set BS1 is "0000," and the size is "10." The starting LBA is "0000" for the block set BS11 after migration as well, and the size is also "10."

Note that the information stored in the compressed LBA control table 500 is not limited to combinations of starting LBAs and sizes, but rather can also use any given information that can be used for specifying the block set. For example, combinations of the starting LBAs and the ending LBAs may be used instead.

In the next step, S125, the data relay module 600 determines whether or not migration has been completed for all of the data. If not completed, then the data relay module 600 returns to Step S100.

Next, the procedure will be explained for the case when data is migrated within the compressed area A2. In the example at the bottom of FIG. 4, the data relay module 600 reads out the data DBS5 from the 5th block set BS5 in the compressed area A2 (Step S100).

Once Step S100 has been completed, the data relay module 600 moves to Step S105. Because the 5th block set BS5 is within the compressed area A2, the data relay module 600 moves to Step S110.

In Step S110, the data relay module 600 compresses the read out data in the data compression circuit 320 (FIG. 1). At this time, the algorithm set in the set up screen in FIG. 3 is used. In FIG. 4, the data compression circuit 320 generates the data DBS15$c$ through compressing the data DBS5. The size of the data DBS15$c$ after compression is five blocks.

In the next step, S115, the data relay module 600 stores the post-compression data into the migration destination logical volume LDEV1. At this time, the data relay module 600 selects the migration destination blocks sequentially from the front (the side wherein the LBA is the smallest). In FIG. 4, the data DBS15$c$ is stored in the 5th block set BS15$c$. The size of this block set BS15$c$ is five blocks.

In the next step, S120, the data relay module 600 stores into the compressed LBA control table 500 the correspondence relationship between the pre-migration and post-migration block sets BS5 and BS15c. In FIG. 6 (A), the starting LBA for the pre-migration 5th block set BS5 is "7990," and the size is "10." For the post-migration 5th block set BS15c, the starting LBA is "5808," and the size is "5."

The same migration process is performed for the other block sets as well. In FIG. 4, the second block set BS2 is migrated to the second block set BS12, and the third block set BS3, after compression, is migrated to the third block set BS13c, and the 4th block set BS4, after compression, is migrated to the 4th block set BS14c. Note that although, in FIG. 5, the series of processes from Step S100 to Step S125 are performed for each individual block set, but instead, this series of processes can be performed for each plurality of block sets.

Once the migration has been completed in this way for all of the data, then, in the next step, S130, the data relay module 600 updates the volume status control table 520. FIG. 6 (B) is a diagram showing an example of a volume status control table 520. The volume status control table 520 stores the correspondence relationships of the LDEVNs, whether or not the data is compressed, whether or not the data is encrypted, and the algorithm used. The data relay module 600 stores, as information regarding the migration destination logical volume LDEV1, "Compression: enabled," "Encryption: disabled," and "Algorithm: LHA."

In the next step, S135, the data relay module 600 updates the logical volume control table 510. FIG. 6 (C) is a drawing showing an example of a logical volume control table 510. The data relay module 600 updates the LDEVN corresponding to the 0th logical unit LU0 from "0" to "1."

Once the processes described above have been completed, then the disk array control unit 300 terminates the compression/migration process. The result is that a non-compressed area A11, a compressed area A12 and an open area A13 are formed in the migration destination logical volume LDEV1.

A3. Read Process

Figure 7:
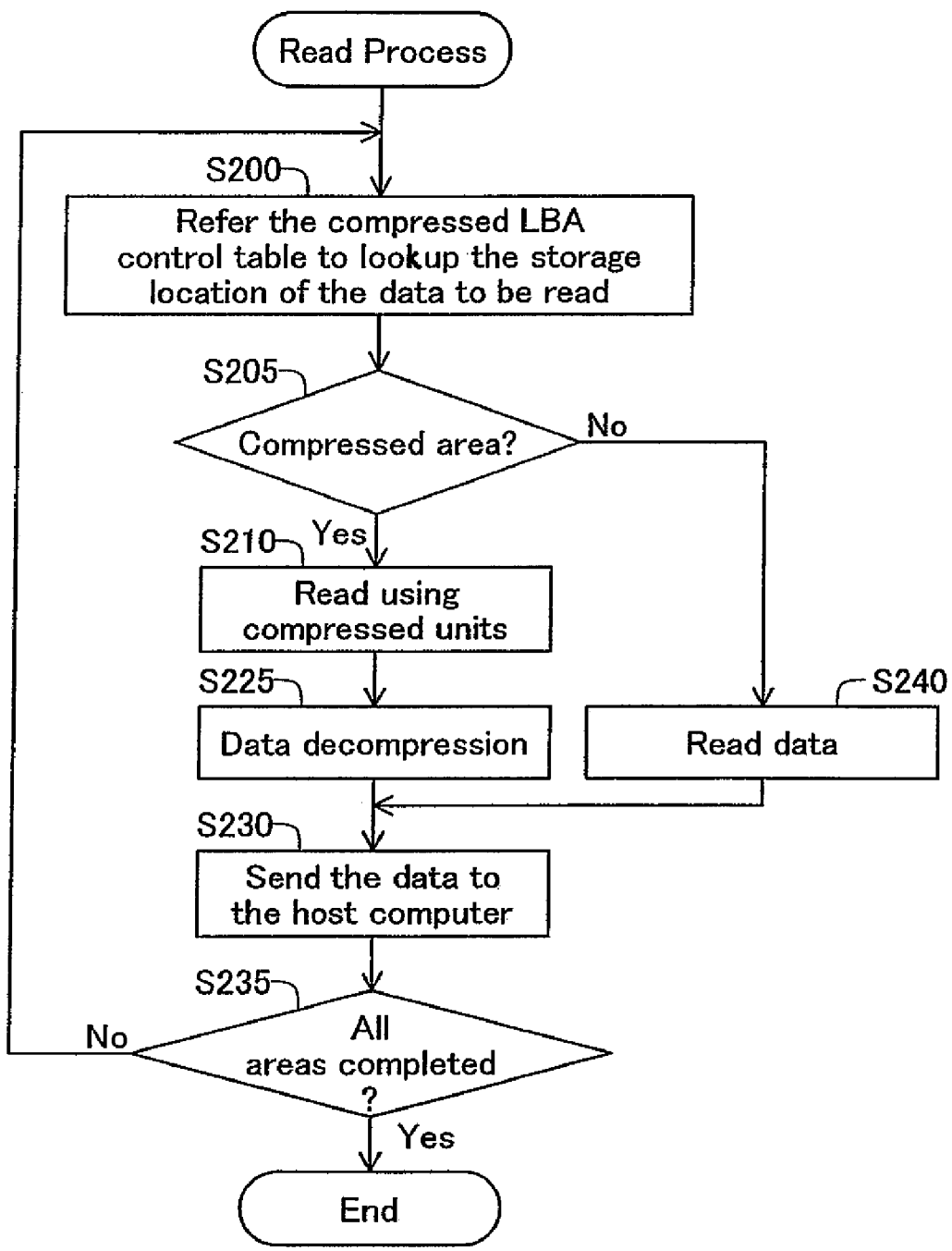
FIG. 7 is a flowchart showing the procedures for the data read process for the storage system 200.

FIG. 7 is a flowchart showing the procedures for the process for reading data from the storage system 200. As described above, a LUN and a LBA are specified by the host computer 110 to the storage system 200 to request that the data be read. The explanation below will assume that the first logical volume LDEV1 (LUN=0) has been specified.

Figure 8:
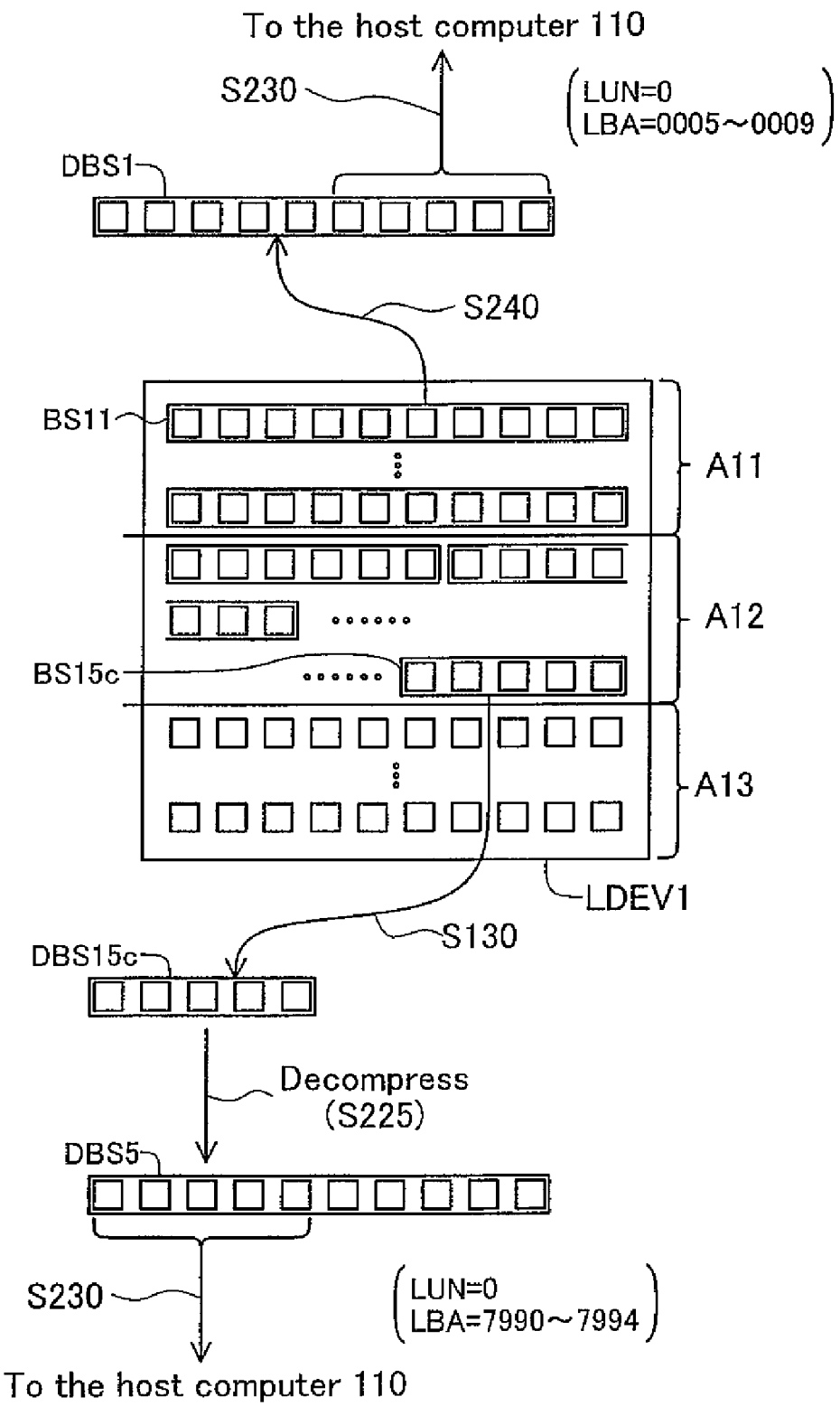
FIG. 8 is a drawing showing an overview of the read process.

FIG. 8 is a drawing showing an overview of the read process. In FIG. 8, the top shows the case of reading data from the non-compressed area A11, and the bottom shows the case of reading data from the compressed area A12.

The procedure in the case of reading data from the non-compressed area A11 will be explained first. In Step S200 (FIG. 7) the data relay module 600 looks up from the compressed LBA control table 500 (FIG. 6 (A)) the combination of pre-migration block set and post-migration block set that includes the specified logical block. In the example at the top of FIG. 8, the specified LBAs are "0005" through "0009." In this case, a combination of the first block set BS1 and the first block set BS11 is looked up.

In the next step, S205, the data relay module 600 determines whether or not the looked up block set has been subjected to a compression process. This determination is performed by referencing the compressed LBA control table 500. In the example at the top of FIG. 8, the decision is "no."

In the next step, S240, the data relay module 600 reads the data from the post-migration block set looked up in Step S200, within the first logical volume LDEV1. In the example at the top of FIG. 8, the data DBS1 is read from the first block set BS11.

In the next step, S230, the data relay module 600 obtains, from the data that has been read, the data associated with the specified LBA, and transfers this data to the host computer 110. In the example at the top of FIG. 8, from the 10 blocks worth of data included in data DBS1, the 5th through 9th blocks are the data for the logical blocks for "LBA=0005" through "LBA=0009."

In the next step, S235, the data relay module 600 determines whether or not the transfer of data has been completed for all of the specified LBAs. If not complete, then the data relay module 600 returns to the Step S200, and iterates the series of steps from S200 through S230 for the specified LBAs for which data transfer has not yet been completed. This series of processes is performed for each individual block set. However, this series of processes may be performed for each plurality of block sets instead.

The procedures will be explained next for the case wherein data is read from the compressed area A12. The bottom part of FIG. 8 shows the case wherein the specified LBAs are "7990" through "7994." In this case, the data relay module 600 looks up the combination of the 5th block set BS5 and the 5th block set BS15c in Step 200. (FIG. 6 (A))

Once Step S200 has been completed, the data relay module 600 moves to the next step, S205. In the example at the bottom of FIG. 8, the decision is "yes."

In the next step, S210, the data relay module 600 reads the data from the post-migration block set specified in Step S200. In the example at the bottom of FIG. 8, data DBS15c is read from the 5th block set BS15c associated with the 5th block set BS5.

Note that the pre-migration 5th block set BS5 that includes the specified LBAs corresponds to the "first block set" in the present invention. Moreover, the post-migration 5th block set BS15c corresponds to the "second block set" in the present invention. Moreover, the LUN, pre-compression starting LBA, and pre-compression size, as a whole, correspond to information indicating the "first block set logical storage location" in the present invention. In addition, the LDEVN, the post-compression starting LBA, and post-compression size, as a whole, correspond to the information indicating the "second block set physical storage location" in the present invention.

In the next step, S225, the data relay module 600 decompresses, in the data decompression circuit 330 (FIG. 1), the data that has been read. This decompression process is the reverse conversion process of the compression process that had been performed by the data compression circuit 320. The data decompression circuit 330 references the volume status control table 520 (FIG. 6 (B)) to select a decompression process with the appropriate algorithm. In the example at the bottom of FIG. 8, the data decompression circuit 330 produces data DBS5 through decompressing the data DBS15c.

In the next step, S230, the data relay module 600 obtains, from this data that has been generated, the data associated with the specified LBAs, and transfers this data to the host computer 110. In the example at the bottom of FIG. 8, of the 10 blocks of data included in the data DBS5, the data for the 0th to 4th blocks are the data for each block from "LBA=7990" through "LBA=7994."

When all of the data for the specified LBAs has been transferred in this way, the disk array control unit 300 terminates the data read process.

In the read process, described above, the storage system 200 has a compressed LBA control table 500, and the data relay module 600 reads and decompresses the data by referencing this compressed LBA control table 500, and sends to the host computer 110 the data for the requested logical blocks. Consequently, even when data is compressed and stored in the storage system 200, the host computer 110 controls neither the decompression process nor the compressed data, and can read data through the specification of the pre-compression LBA.

Figure 9:
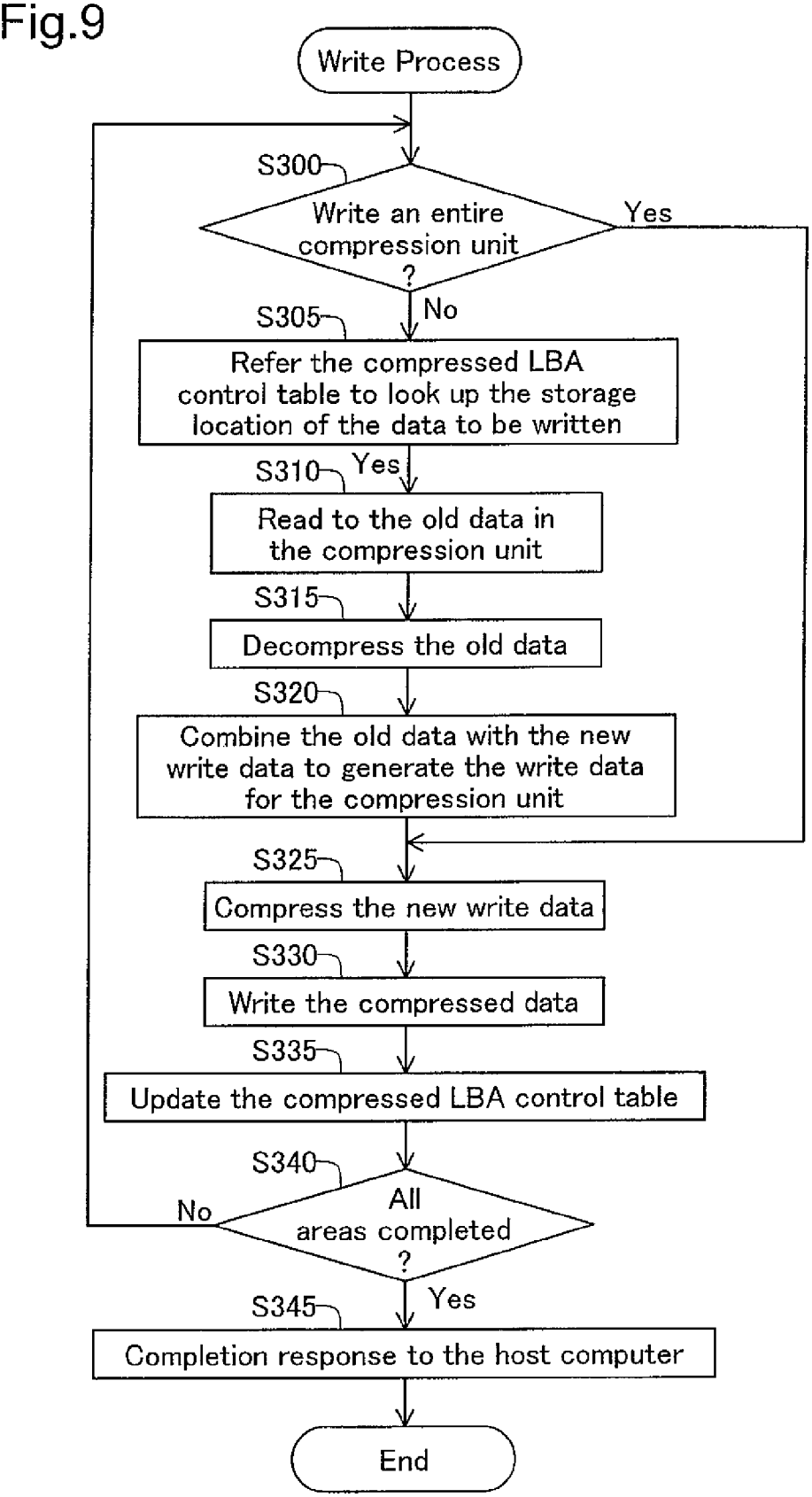
FIG. 9 is a flow chart showing the procedures for the data write process for the storage system 200.

A4. Write Process:

FIG. 9 is a flow chart showing the procedures for the process of writing data to the storage system 200. As with the read process, the host computer 110 specifies the LUN and the LBA to the storage system 200 in order to request that data be written. The explanation below will assume that the first logical volume LDEV1 (LUN=0) is specified.

FIG. 10 is a drawing showing an overview of the write process. FIG. 10 shows an overview of the process in the case of writing data to the compressed area A12. First, in Step S300 (FIG. 9), the data relay module 600 determines whether or not the specified LBAs include all of the logical blocks in a single compressed unit (block set). This decision is made by referencing the compressed LBA control table 500 (FIG. 6 (A)). FIG. 10 shows the case where the specified LBAs are from "7990" through "7995." The specified blocks are the logical blocks for only a portion (6 logical blocks) of the 5th block set BS5. As a result, in this case, the data relay module 600 decides "no."

Note that the specified LBAs may contain blocks from a plurality of compressed unit (block sets). In such a case, the data relay module 600 performs the series of processes, for each block set, following Step S300 (explained below).

In each Step S305, the data relay module 600 references the compressed LBA control table 500 (FIG. 6 (A)) to look up the combination of pre-migration block set and post-migration block set that includes the specified logical blocks. This process is the same as the process in Step S200 in FIG. 7. In FIG. 10, the combination of the 5th block set BS5 and the 5th block set BS15c is looked up.

In the next step, S310, the data relay module 600 reads the data from the post-migration block set looked up in Step S305. In FIG. 10, the data DBS15c is read from the 5th block set BS15c.

In the next step S315, the data relay module 600 decompresses, in data decompression circuit 330 (FIG. 1), the data that has been read. This process is the same as in Step S225 in FIG. 7. In FIG. 10, the data compression circuit 330 generates the data DBS5 through decompressing the data DBS15c. The data that is generated in this way is used as the pre-update data for the block set to be updated.

In the next step S320, the data relay module 600 overwrites the pre-update data with the data for which the host computer 110 has requested writing, thereby generating the data to be written to the compressed unit. In FIG. 10, the data relay module 600 generates the post-update data DBS5u by overwriting the data in the 0th through 5th block of the pre-update data DBS5 with the update data DULB obtained from the host computer 110.

In the next step S325, the data relay module 600 compresses the post-update data in the data compression circuit 320 (FIG. 1). This process is the same as the process in Step S10 in FIG. 5. In FIG. 10, the data compression circuit 320 generates the post-compression data DBS15uc by compressing the post-update data DBS5u. The size of this new post-compression data DBS15uc is six blocks.

Note that the processes in Steps S305 through S320 are omitted if updating the data in all of the blocks in a single compressed unit (block set). In this case, the single-block set worth of data requested to be written is compressed as post-update data.

In the next step, S330, the data relay module 600 stores the post-compression data to an open area A13 of the first logical volume LDEV1. In this case, the data relay module 600 selects the storage destination logical blocks sequentially from the front (the side where the LBA is the smallest). In FIG. 10, the data DBS15uc is stored in the 5th block set BS15uc.

In this step S330, the data relay module 600 selects a logical block in an unused area of the open area A13. Any given method may be used for the method of discriminating between the used area and the unused area of the open area A13. For example, a method can be employed, in which the data relay module 600 stores in the local memory 344 an LBA that indicates the boundary between the used area and the unused area, and performs referencing and updating the LBA as appropriate.

In the next step, S335, the data relay module 600 updates the compressed LBA control table 500. FIG. 11 is a drawing showing an example of a post-update compressed LBA control table 500. The data relay module 600 updates the information for the post-migration block set associated with the 5th block set BS5, doing so from the old 5th block set BS15c to the new 5th block set BS15uc. In FIG. 11, the starting LBA is "5813," and the size is "6." When, after this, the data relay module 600 receives a read request for the 5th block set BS5, the data is read from the new 5th block set BS15uc. After this point, the data in the old 5th block set BS15c is not used.

In the next step, S340, the data relay module 600 determines whether or not the write process has been completed for all of the specified LBAs. If not complete, the data relay module 600 returns to Step S300, and repeats the series of processes from Step S300 through Step S335 for those specified LBAs for which the writing has not been completed. This series of processes is repeated for each individual block set. But instead, this series of processes may be performed for each plurality of block sets.

Once writing has been completed for the data for all of the specified LBAs in this way, then in the next step, S345, the data relay module 600 sends to the host computer 110 a notification that the writing of the data has been completed.

In the write processes described above, the data relay module 600 compresses and stores data when the data relay module 600 has received a data write request from the host computer 110, and also write, to the compressed LBA control table 500, a new correspondence relationship between the pre-compression and post-compressing (pre-migration and post-migration) block sets. Consequently, even when the storage system 200 compresses and stores the data, the host computer 110 can write the data through specifying the pre-compression LBAs without performing the compression process and without controlling the compressed data.

Moreover, when there is not a request to update all of the blocks in the pre-compression block set that includes the specified LBAs, the data relay module 600 overwrite the pre-update data within the block set with the requested data to perform the compression process using the block set as the unit. This makes it possible to prevent the control of the post-compression data from becoming excessively complex.

Note that the post-update post-compression data may be stored in a logical volume that is different from the logical volume in which the pre-update post-compression data was stored. Doing so makes it possible to write the post-update data to a logical volume that has a recording area larger than the open area A13, and makes it possible to accommodate the updating of large amounts of data. In such a case, the LDEVN that includes the post-migration block set may be added to the correspondence relationships for the pre-compression and post-compression (pre-migration and post-migration) block sets in the compressed LBA control 500 (FIG. 6 (A)).

Moreover, if the post-update compressed data is smaller than the pre-update compressed data, then the post-update compressed data may be stored in the logical block wherein the pre-update compressed data had been stored. Doing so makes it possible to increase the efficiency with which the logical blocks are used.

A5. Compression Restore Process

Figure 12:
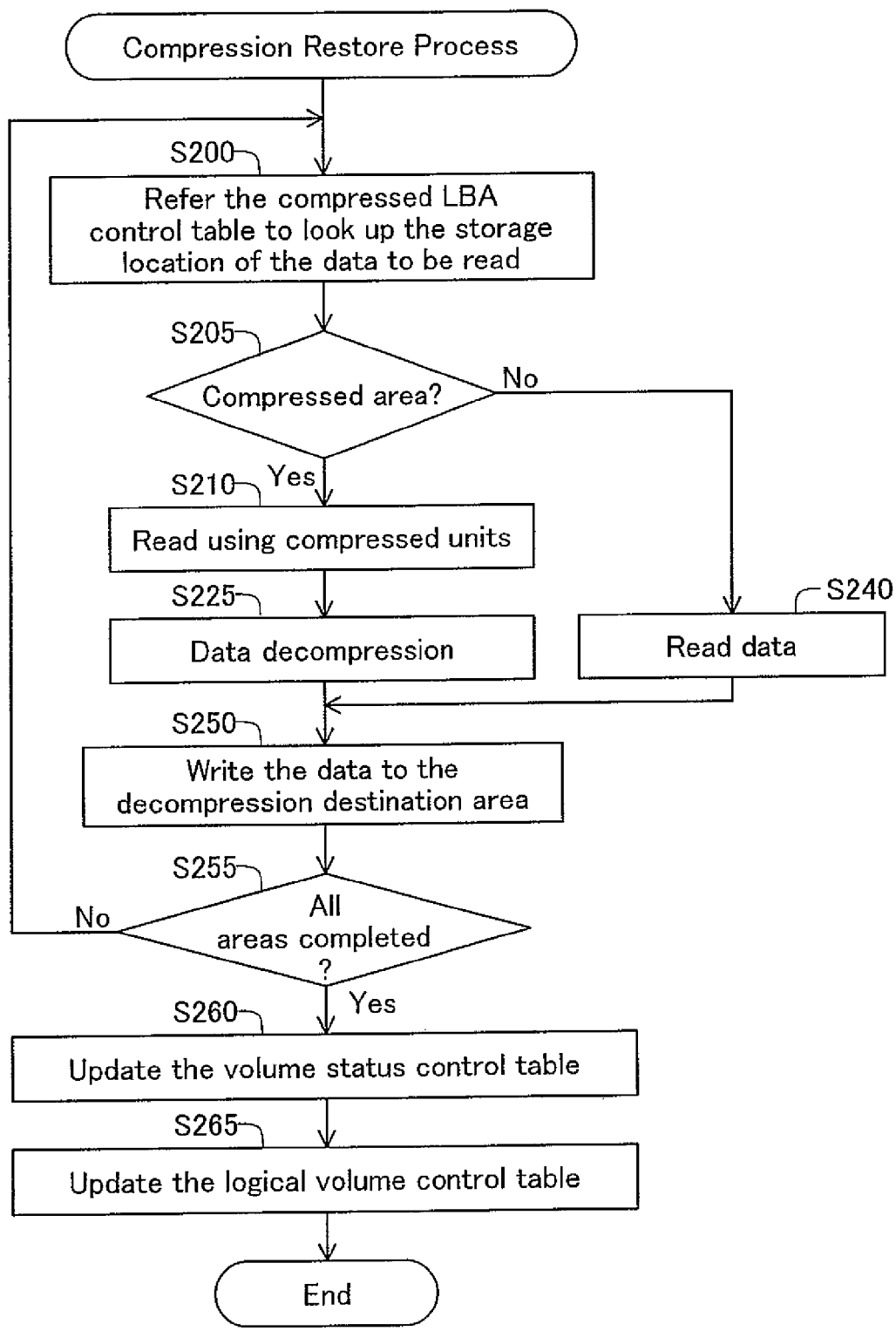
FIG. 12 is a flowchart showing the procedures for the compression restore process.

FIG. 12 is a flowchart for the procedures for the compression restore processes. The "compression restore processes" are the processes that decompress and re-store the compressed data stored in a logical volume. In the first embodiment, a single logical volume's worth of data is migrated to another logical volume while decompressing. The compression restore process is performed by the disk array control unit 300 following instructions from the control terminal 120 (FIG. 1). In the below, the explanation will be of migrating a first logical volume LDEV1 to a second logical volume LDEV2. Note that, for the decompression destination (the migration destination) logical volume, the data relay module 600 automatically selects from among the open logical volumes. Note that this selection may instead be done by an operator.

The disk array control unit 300 reads out data for each block set and further decompresses the read-out data as appropriate, in the same manner as the read process shown in FIG. 7. However, there are three differences from the read process in FIG. 7. The first difference is that a single logical volume's worth of data is read, instead of the data specified by the host computer 110. The second difference is that a process is performed (in Step S250) to write to the decompression-destination (migration-destination) logical volume instead of a process to transfer the read-out data to the host computer 11 (FIG. 7: Step S230). The third difference is that, when the migration has been completed, the volume status control table 520 (FIG. 6 (B)) and the logical volume control table 510 (FIG. 6 (C)) are updated (in Steps S260 and S265).

The processes from Steps S200 through S250 are the same as the read processes in FIG. 7.

In Step 250, the data relay module 600 stores the read data in the decompression-destination (migration-destination) logical volume. In the first embodiment, the data relay module 600 selects the decompression-destination logical blocks so that the decompression-destination logical block LBA is the same as the pre-compression logical block LBA.

In the next step, S255, the data relay module 600 determines whether or not data migration has been completed for all of the pre-compression LBAs. If not complete, then the data relay module 600 returns to Step S200, and repeats the processes in the series of steps from S200 through S250 for the block sets for which data transfer is not complete. This series of processes is performed for each single block set. However, this series of processes may be performed for each plurality of block sets.

After the data transfer has been completed, then in the next step, S260, the data relay module 600 updates the information regarding the decompression-destination logical volume in the volume status control table 520 (FIG. 6(B)). For example, "Compression: Disabled," "Encryption: Disabled," and "Algorithm: None," are set for the decompression-destination second logical volume LDEV2.

In the next step, S265, the data relay module 600 switches the LDEVN in the logical volume control table 510. For example, the data relay module 600 changes the LDEVN corresponding to the 0th logical unit LU0 from "1" to "2." Note that the switching of the LDEVN may be performed with timing according to an instruction from the control terminal 120.

After this, when the data relay module 600 receives a data transfer request (such as a read request or a write request) for the 0th logical unit LU0, the data transfer is performed regarding the new second logical volume LDEV2. At this time, the specified LBA (the pre-compression LBA) is used as is for the LBA for the logical volume.

In the compression restore process described above, the disk array control unit 300 performs the data decompression without placing an additional load on the host computer 110. Moreover, the data relay module 600 selects logical blocks for storing the post-decompression data so that the pre-compression LBAs are the same as the decompression-destination LBAs. Consequently, even when the storage system 200 has decompressed the compressed data, the host computer 110 is able to perform data transfer requests through specifying the pre-compression LBAs, without having to control the decompression process or the decompressed data.

Note that it is not necessary for the LBAs for the decompression-destination logical blocks to match the LBAs of the pre-compression logical blocks. In this case, the correspondence relationships between the pre-compression LBAs and the post-decompression LBAs should be stored in the storage system 200. Doing so makes it possible to have appropriate data transfer, through referencing these types of correspondence relationships when the data relay module 600 receives a data transfer request.

Given the first embodiment, explained above, the disk array control unit 300 (FIG. 1) performs the compression/migration process independently from the host computer 110, making it possible to economize the storage area without putting an additional load on the host computer 110.

Moreover, in the first embodiment, the logical volume data is split between multiple block sets and compressed. Consequently, when compared to the case wherein the entire logical volume is compressed as a single data, it is possible for the speed of the data transfer process on partial areas of the logical volume to prevent excessive delays.

Furthermore, in the first embodiment, the storage system 200 not only stores control data regarding the correspondence relationships of the pre-compression and post-compression block sets (the compressed LBA control table 500, the logical volume control table 510, and the volume status control table 520), but also performs data compression and decompression, and updating of control data, independently from the host computer 110. Consequently, it is possible to perform the data compression and decompression without placing an additional load on the host computer 110.

In particular, in the first embodiment, the storage system 200 has a compressed LBA control table 500 that stores the correspondence relationship between the LBA specified by the host computer 110 (the pre-compression LBA) and the actual LBA (the post-compression LBA). As a result, the disk array control unit 300 is able to receive a data transfer request that specified the pre-compression LBA from the host computer 110 in a consistent manner regardless of the data compression status (i.e., regardless of whether or not the data is compressed, and regardless of whether or not there have been changes in the LBAs in the blocks wherein the data is stored). In other words, the disk array control unit 300 can hide the data compression status from the host computer 110. This makes it possible for the host computer 110 to request a data transfer using a specific pre-compression LBA without having to control the data compression status.

In addition, even when the data that is stored in the storage system 200 is shared by a plurality of host computers, each computer is able to perform data transfer requests using the shared pre-compression LBA regardless of the data compression status. In this way, the storage system 200 in the first embodiment makes it possible to provide storage areas without constraining the host computers, regardless of the data compression status. This ability to operate without constraints on the host computers will be termed "host transparent," below.

Note that in the first embodiment, the compressed LBA control table 500 and the logical volume control table 510, as a whole, correspond to the "block correspondence relationships" in the present invention.

B. Second Embodiment

Figure 13:
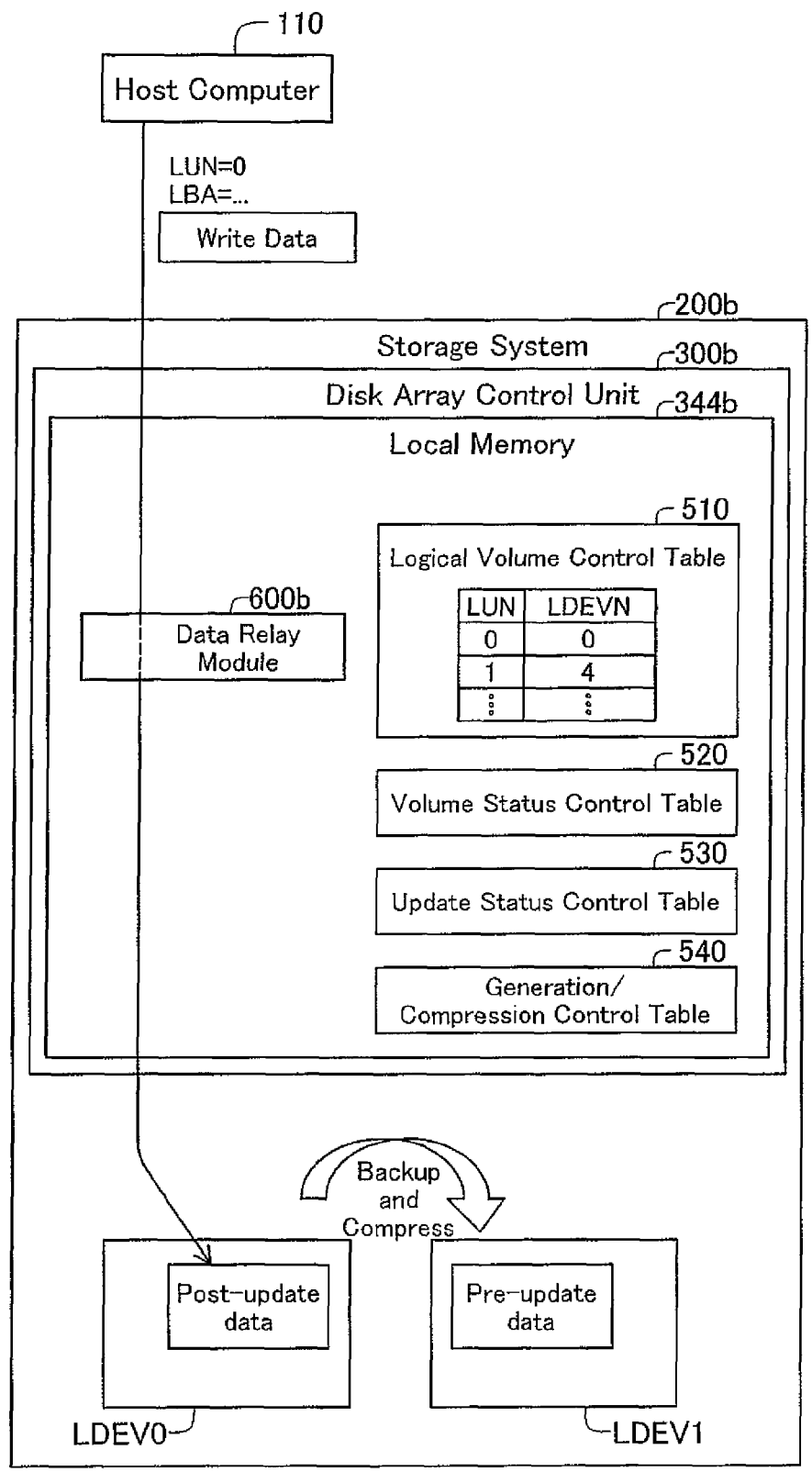
FIG. 13 is a drawing showing the structure of the storage system 200b in a second embodiment.

FIG. 13 is a drawing showing the structure of a storage system 200b in a second embodiment. The differences from the storage system 200 shown in FIG. 1 are in that the data relay module 600b not only stores a data update history, but also performs generation control of the update history. Moreover, the local memory 344b stores an update status control table 530 and a generation/compression control table 540 instead of the compressed LBA control table 500. These tables 530 and 540 are used in generation control. The other structures are the same as in the storage system 200 of FIG. 1 and FIG. 2. Note that in FIG. 13, only the local memory 344b of the disk array control unit 300b is shown as a structural element of the storage system 200b, and the other structural elements are omitted in the drawings.

In the second embodiment, the 0th logical unit LU0 is assigned as corresponding to the 0th logical volume LDEV0 (FIG. 13: Logical volume control table 510). Moreover, the data of the 0th logical volume LDEV0 is not compressed. Given this, the data relay module 600b uses the specified LBA as is as the LBA corresponding to the 0th logical volume LDEV0.

Moreover, the data relay module 600b holds the update history of the data in the 0th logical volume LDEV0, and performs generation control on the update history. This makes it possible to provide to the host computer 110 not just the most recent data, but also data for the 0th logical volume LDEV0 from some point in the past. This data backup for some point in the past is called a "point-in-time copy" or a "snapshot (trademark of Network Appliance, Inc.)."

The data relay module 600b receives an instruction, from the host computer 110, from the control terminal 120, etc. to create a "point-in-time copy." In response, the data relay module 600b stores backup data to make it possible to provide, later, the data of any given logical block from the point in time at which the instruction was received (hereinafter termed "point in time of the instruction"). At this time, the data relay module 600b stores the pre-update data of only those partial areas that are updated after the point in time of the instruction as the backup data. A process that copies only the updated part (the modified part) is known as "copy-on-write." Note that the data relay module 600b stores the backup data into a first logical volume LDEV1 that is different from the origin 0th logical volume LDEV0. At this time, the backup data is compressed and stored (as will be described in detail below).

Figure 14:
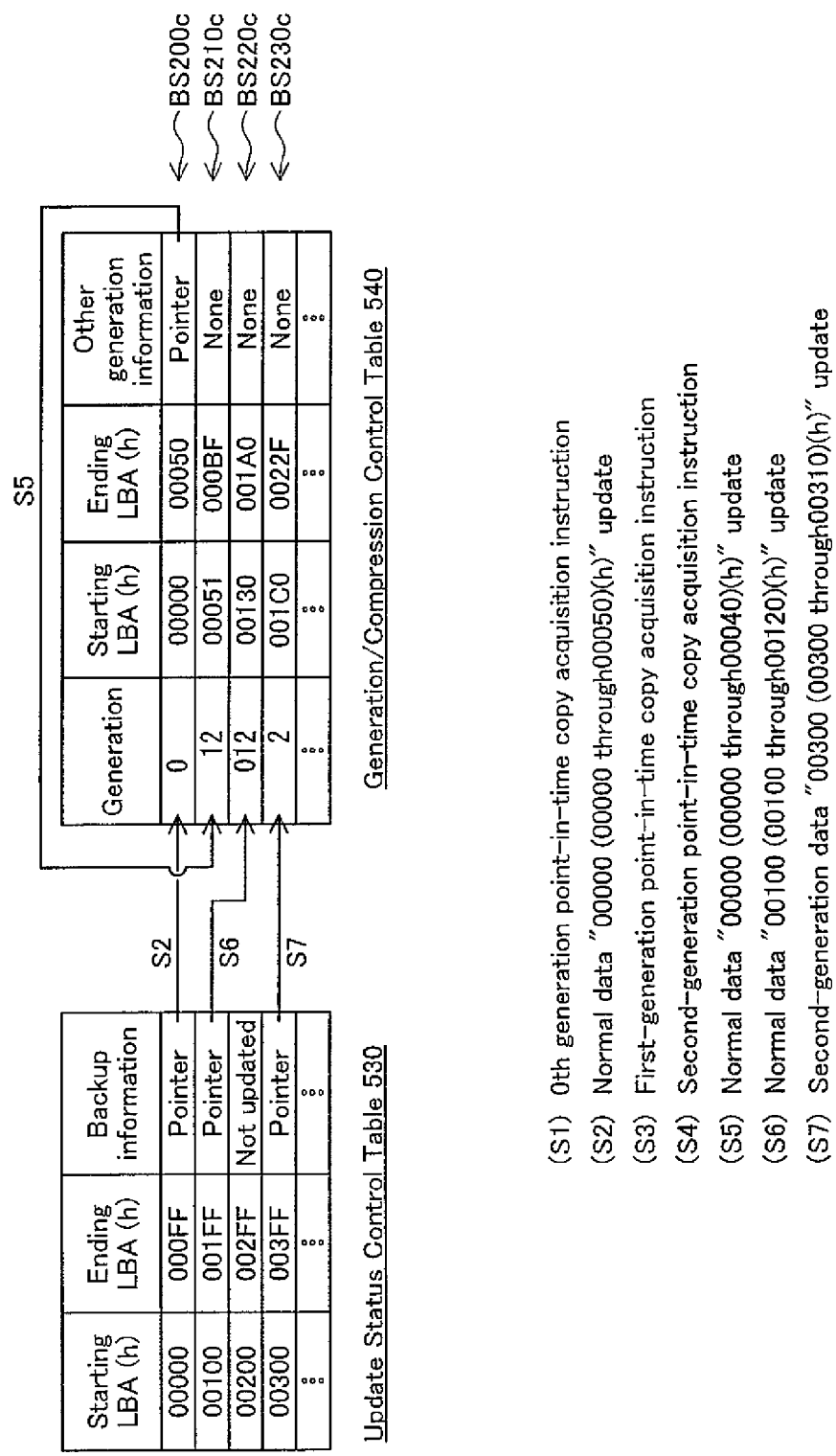
FIG. 14 is a drawing showing an example of the update status control table 530 and the generation/compression control table 540.

B1. Write Process (Update Process):

FIG. 14 is a drawing showing an update status control table 530 and a generation/compression control table 540. These tables 530 and 540 are examples showing the case wherein data updating is performed following the procedures in Steps S1 through S7 shown at the bottom of FIG. 14.

The update status control table 530 stores the correspondence relationships between the block sets in the 0th logical volume LDEV0 and whether or not there is backup data. In the second embodiment, the data relay module 600b partitions the 0th logical volume LDEV0 into a plurality of block sets. Furthermore, the data relay module 600b performs storing and generation controlling of the update history by using the block set as the processing unit. In FIG. 14, the processing unit is the block set comprising 100 (hexadecimal) logical blocks with continuous LBAs. In the update status control table 530, the block sets are identified by a combination of starting LBAs and ending LBAs. In FIG. 14, four block sets BS100 through BS130 are shown for illustration. On the other hand, a pointer that references information (described in detail below) that indicates the backup status of the pre-update data is used as the backup information. Pointers are not set up for block sets wherein the data has not been updated.

Note that the symbol "(h)" that is added to the LBA indicates that the LBA is written in hexadecimal notation. In the below, LBAs with the additional symbol "(h)" will indicate that the LBAs are written in hexadecimal notation, where LBAs without the additional symbol are written in decimal notation.

On the other hand, the generation/compression control table 540 stores the backup status of the pre-update data. Specifically, this table stores the correspondence relationships between the block sets that store the pre-update data, the generation numbers of the pre-update data, and the pointers that reference the information for pre-update data of other generations. The pointers that reference the information for other generations reference one other correspondence relationship in the generation/compression control table 540. Moreover, the "pointer" in the update status control table 530, described above, references one correspondence relationship within this generation/compression control table 540. The "generation number" will be described below.

First, in the first step S1, the control terminal 120 sends to the disk array control unit 300b an instruction to create a point-in-time copy. This type of instruction is sent in response to an operation by the operator. Note that the disk array control unit 300b or the control terminal 120 may instead generate the instruction automatically with a timing that is set up in advance, or may generate the instruction automatically following some other set of conditions.

In the second embodiment, the disk array control unit 300b can generate multiple point-in-time copies at different points in time. The point-in-time copy is identified by a unique generation number for each individual point-in-time copy. In the second embodiment, serial numbers, beginning with "0" are used as the generation numbers. In FIG. 14, the data relay module 600b assigns "0" to the point-in-time copy indicated in Step S1. Note that the generation (point in time) corresponds to the "version" in the present invention.

Next, in Step S2, the host computer 110 requests that data be written to the storage system 200b. Here the specified LBAs are assumed to be "00000(h)" through "00050(h)."

Figure 15:
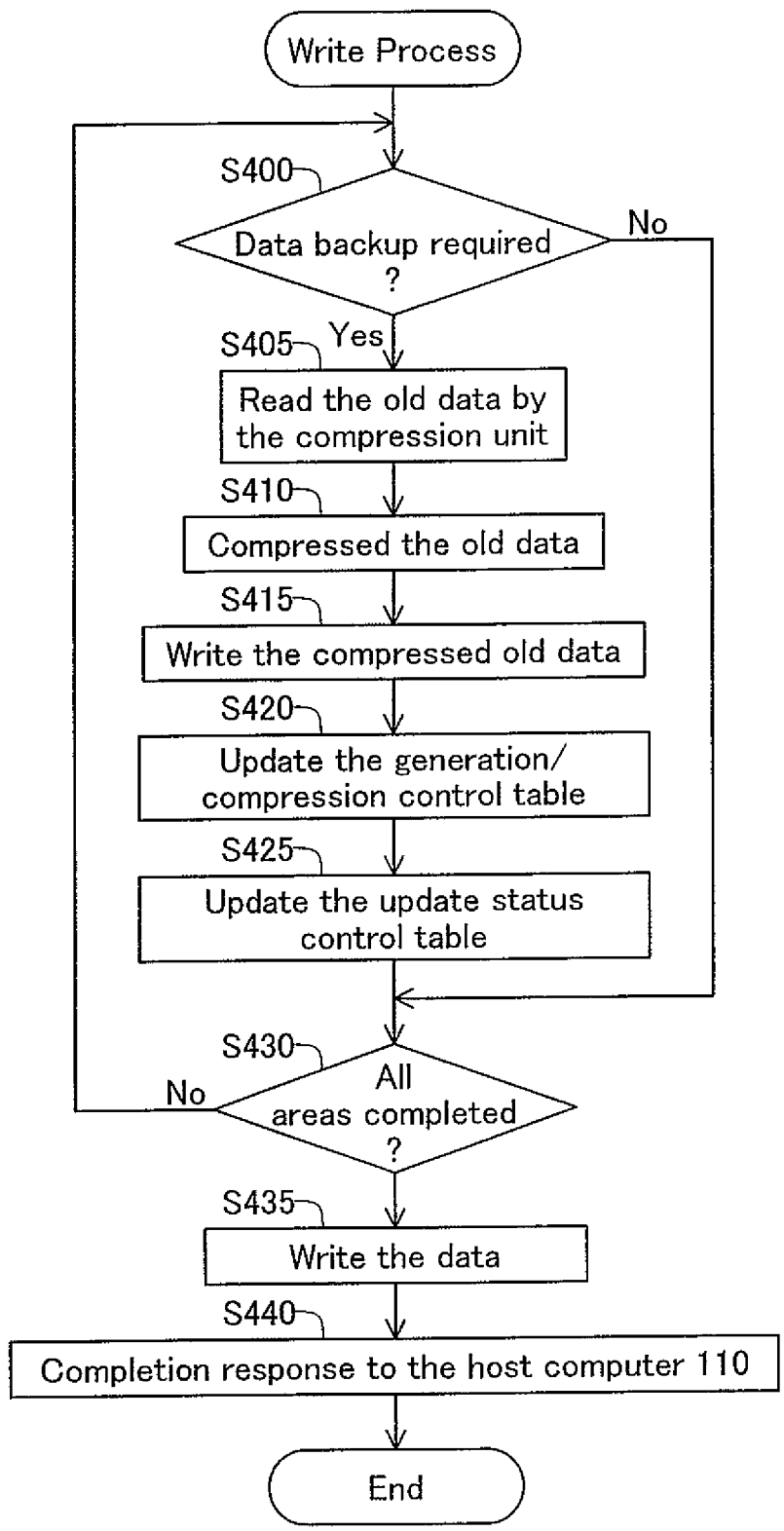
FIG. 15 is a flowchart showing the procedures for the data write process.

FIG. 15 is a flowchart showing the procedures for the data write process. In the first step, S400, the data relay module 600b determines whether or not a data backup is necessary. The writing to the block set that includes the specified LBAs (hereinafter termed the "specified block set") is determined to "require backup" when it is the first writing of the specified block set since the most recent specified point in time, or in other words, if no data has been written to the specified block set since the most recent specified point in time. The decision is "backup not required" if the data in the specified block set has already been backed up since the most recent specified point in time. In the write process in Step S2 (FIG. 14), the decision is "backup required."

Note that the specified LBAs may include blocks in a plurality of processing units (block sets). In such a case, the data relay module 600b performs a series of processes (described below) following Step S400 for each of the block sets.

Figures 16, 17:
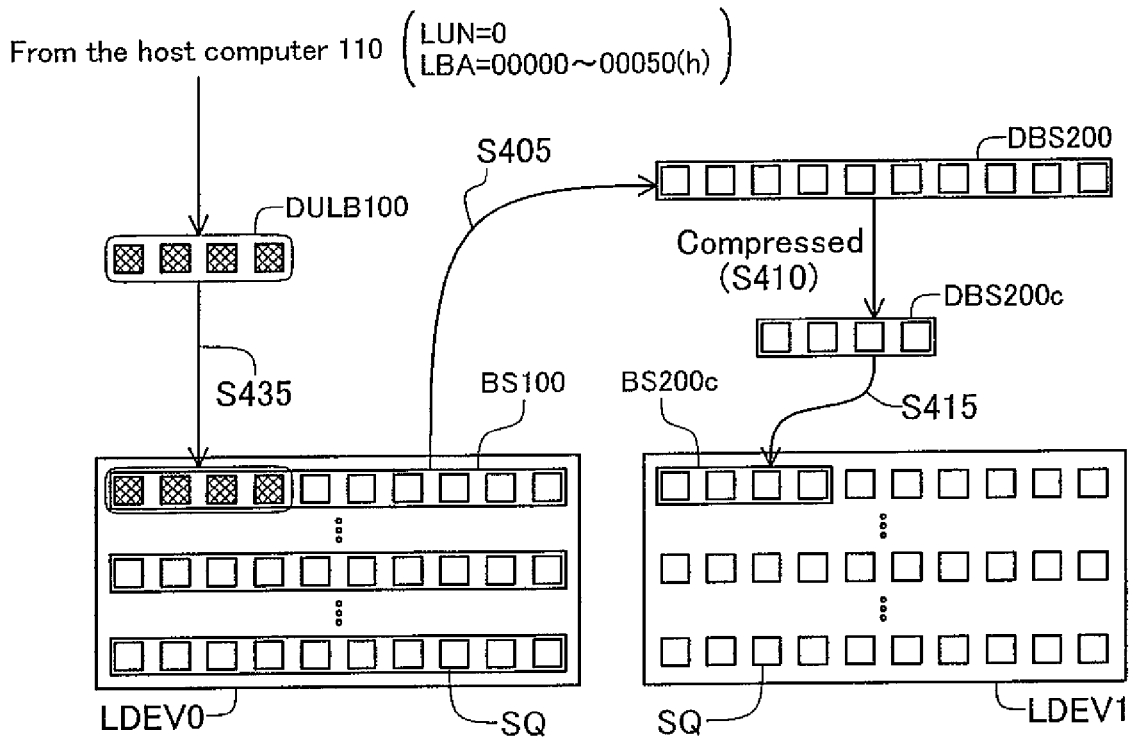
FIG. 16 is a drawing showing an overview of the write process in Step S2.
FIG. 17 is a drawing showing an example of the update status control table 530 and the generation/compression control table 540 in the write process in Step S2.

In the next step, S405 (FIG. 15), the data relay module 600b reads out the data from the specified block set within the 0th logical volume LDEV0. FIG. 16 is a drawing showing an overview of the write process in Step S2 (FIG. 14). In FIG. 16, the data relay module 600b reads out the data DBS200 from the first block set BS100 including the specified LBAs. Here the data that is read out is pre-update data of the specified block set. Note that in FIG. 16, one square symbol SQ does not indicate one block, but rather the number of square symbols SQ provides a rough representation of the number of blocks.

In the next step, S410 (FIG. 15), the data relay module 600b compresses, in the data compression circuit 320 (FIG. 1) the pre-update data that has been read out. In FIG. 16, the data compression circuit 320 generates post-compression pre-update data DBS200c through compressing the pre-update data DBS200. The number of blocks in this post-compression data DBS200c is less than the number of blocks in the pre-compression data DBS200.

In the next step, S415, the data relay module 600b stores the post-compression pre-update data into the first logical volume LDEV1. In FIG. 16, the post-compression pre-update data DBS200c is stored into the first block set BS200c.

In the next step, S420, the data relay module 600b adds, to the generation/compression control table 540, information about the block set in which the pre-update data is stored. FIG. 17 is a drawing showing the update status control table 540 and the generation/compression control table 540 in the write process in Step S2 (FIG. 14). Information regarding the first block set BS200c is added to the generation/compression control table 540. The generation is "0," the starting LBA is "00000(h)," and the ending LBA is "00050(h)," where the other generation information is "none." The fact that the "generation" is "0," is because the pre-update data DBS200c is the 0th generation data.

In the next step, S425, the data relay module 600b updates the backup information for the update status control table 530. According to FIG. 17, a pointer is added to the backup information for the first block set BS100. This pointer is data that references information regarding the first block set BS200c in the generation/compression control table 540.

In the next step, S430, the data relay module 600b determines whether or not the data backup process has been completed for all of the specified LBAs. If not complete, the data relay module 600b returns to Step S400, and repeats the procedures from Step S400 through Step S425 for the specified LBAs that have not been completed. Note that the data relay module 600b omits the processes from Steps S405 through S425, not backing up the data, for block sets for which the decision is "backup not required" in Step S400.

In the next step, S435, the data relay module 600b writes to the logical volume the data requested by the host computer 110. At this time, the specified LBAs are used as is. According to FIG. 16, the data relay module 600b writes the new data DUBL100, received from the host computer 110, to the blocks of the specified LBAs (00000 through 00050(h)) of the 0th logical volume LDEV0. Note that the process of Step S435 may be performed, instead, prior to Step S430 after the completion of the data backup. For example, the writing of data to the block set may be performed each time the block set is backed up.

Once the writing of the data for all of the LBAs has been completed in this way, then, in the next step, S440, the data relay module 600b sends a notification to the host computer 110 that the data writing has been completed.

After this, in response to a read request from the host computer 110, the data relay module 600b will send the newest data that is stored in the 0th logical volume LDEV0.

On the other hand, in response to a read request wherein the generation is specified, the data relay module 600b will reference the update status control table 530 and the generation/compression control table 540 to read data from the block set wherein is stored the data associated with the specified generation in order to send the requested data. For example, an explanation will be given regarding the transmission of data for a read request that specifies the 0th generation first block set BS100. The data relay module 600b first reads out the post-compression pre-update data DBS200c from the 0th generation block set BS200. The data that has been read out is then decompressed in the data decompression circuits 330 (FIG. 1). At this time, the data decompression circuit 330 generates the pre-compression pre-update data DBS200. The data relay module 600b uses the pre-update data DBS200 that has been generated to send the data for the specified LBAs to the host computer 110. When there is no information regarding the specified generation in the generation/compression control table 540, the data stored in the 0th logical volume LDEV0 is sent as is.

Once Step S2 (FIG. 14) has been completed, then in the next step, S3, the control terminal 120 sends to the disk array control unit 300b a new instruction to generate a point-in-time copy. The generation number of this point-in-time copy will be "1." In the next step, S4, the control terminal 120 sends to the disk control unit 300b another instruction to create a point-in-time copy. The generation number of this point-in-time copy will be "2."[0112] In the next step, S5, the host computer 10 performs a data read request on the storage system 200b. Here the specified BAs are "00000 through 00040(h)," where the specified block set is the first block et BS100, the same as in Step S1, described above.

Figures 18, 19:
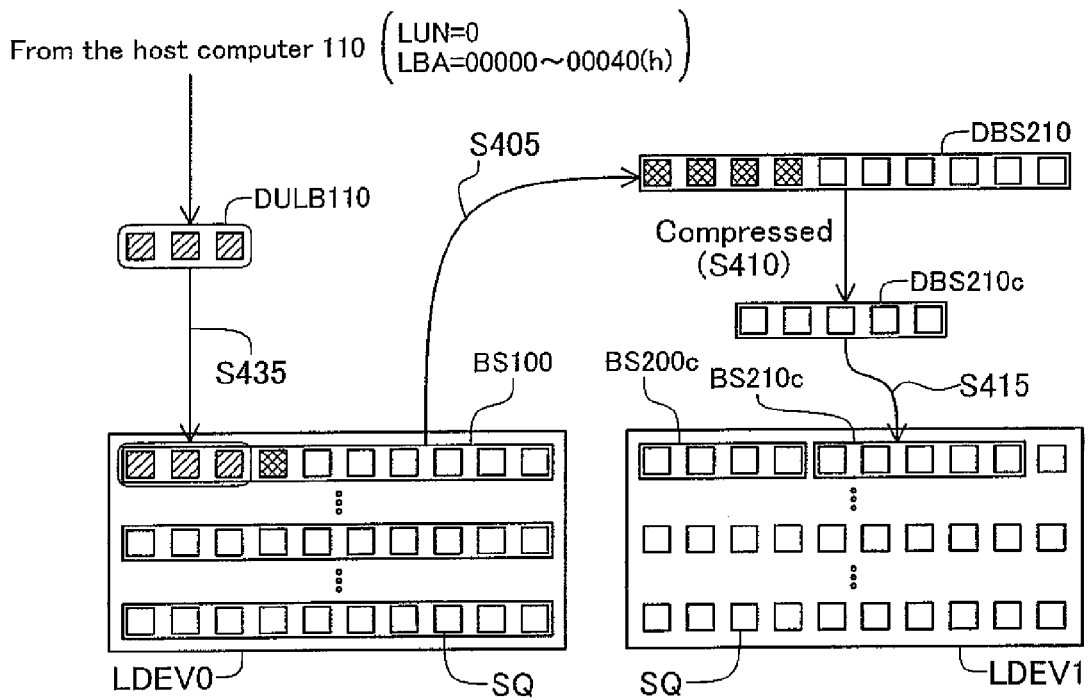
FIG. 18 is a drawing showing an overview of the write process in Step S5.
FIG. 19 is a drawing showing an example of the update status control table 530 and the generation/compression control table 540 in the write process in Step S5.

FIG. 18 is a drawing showing an overview of the write process in Step S5. The details of the write process are the same as in Step S2 according to FIG. 16. However, the data relay module 600b stores the pre-update data of the first block set BS100 into an open second block set BS210c that is different from the earlier block set BS200c. Note that one square symbol SQ does not indicate one block, but rather the number of the square symbols SQ provides a rough representation of the number of blocks.

Specifically, the data relay module 600b reads out the pre-update data DBS210 of the first block set BS100 in Step 405 (FIG. 15). In Step S410, the data compression circuit 320 (FIG. 1) compresses the pre-update data DBS210 to generate the post-compression pre-update data DBS210c. In Step S415 the data relay module 600b stores the post-compression pre-update data DBS210c into the second block set BS210c of the first logical volume LDEV1. In Step S435, the data relay module 600b writes the new data DULB 110, received from the host computer 110, to the blocks of the specified LBAs of the 0th logical volume LDEV0. The result is that the two block sets BS200c and BS210c each store different generations of the past data for the first blocks set BS100.

FIG. 19 is a figure showing an example of the update status control table 530 and the generation/compression control table 540 in the write process of Step S5. The difference from the example shown in FIG. 17 is the addition of information regarding the second block set BS210c to the generation/compression control table 540. Regarding this second block set BS210c, the generation is "1, 2" and the starting LBA is "00051 (h)" and the ending LBA is "000BF(h)," and the generation information is "none." Moreover, a pointer to the other generation data of the first block set BS200c is also added. This pointer references information regarding the second block set BS210c.

In the next step, Step S6 (FIG. 14) the host computer 110 performs a data write request on the storage system 200b. The data relay module 600b performs a write process following the flow chart in FIG. 15, in the same manner as in Steps S2 and S5, described above. According to FIG. 14, the specified LBAs are "00100 through 00120(h)." The information for the block set in which the pre-update data is stored is added to the generation/compression control table 540 (FIG. 14).

B2. Update Process With Specified Generation

In Step S7, the host computer 110 performs a data write request on the storage system 200b. The difference from Steps S2, S5, and S6, described above, is that the write request is performed specifying a past generation.

Figure 20:
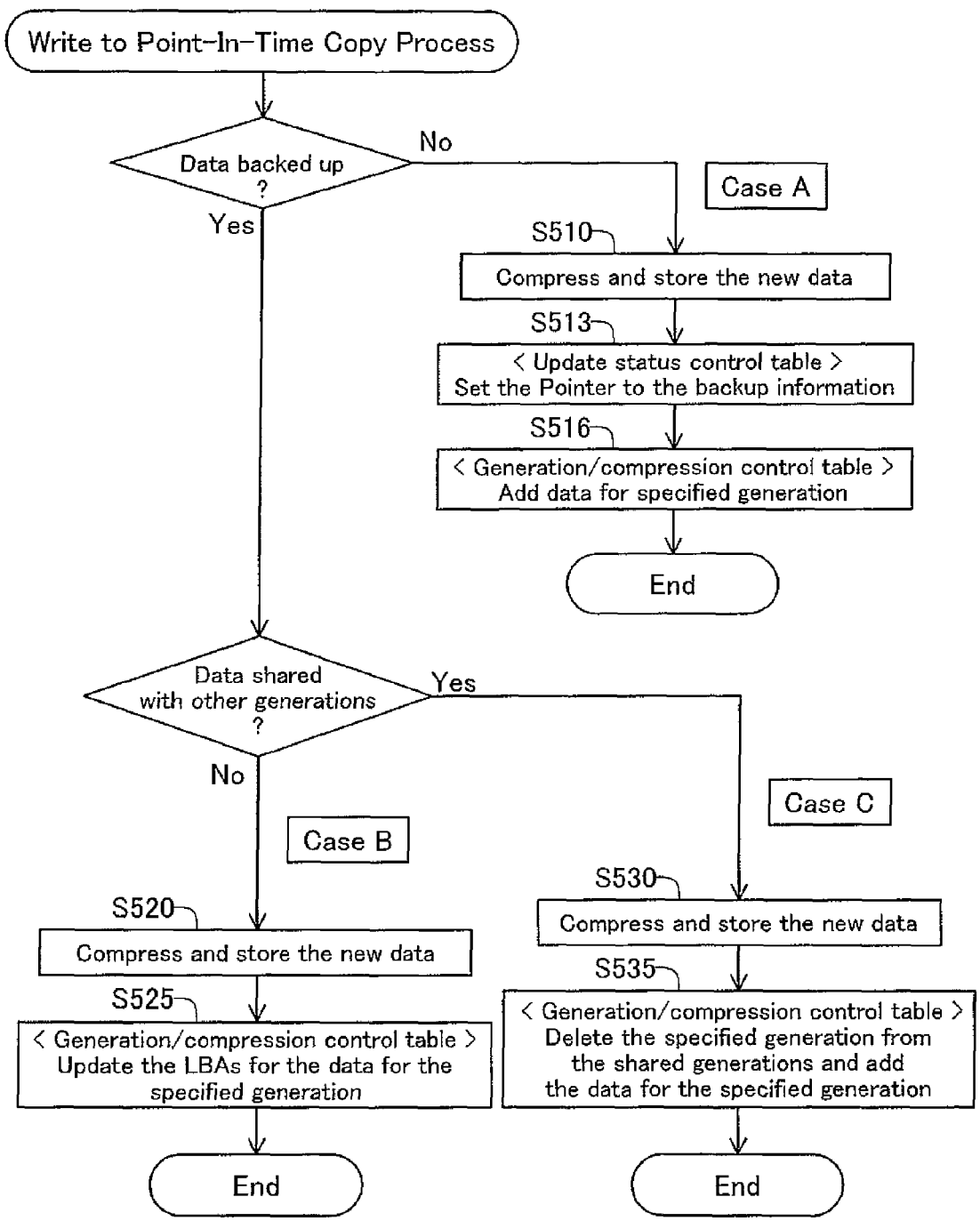
FIG. 20 is a flowchart showing the procedures for the write process for data to past generation.

FIG. 20 is a flowchart showing the procedures for the data update process for a past generation. According to FIG. 20, the process on the specified block set is performed divided into the three cases, A through C, described below. Note that when the specified LBAs include blocks in a plurality of block sets, this division into cases is performed for each individual block set:

Case A: When data for the specified generation is not backed up.
Case B: When data for the specified generation has been backed up, and the backed up data is not shared with another generation.
Case C: When data for the specified generation has been backed up, and the backed up data is data that is shared with another generation.

B3. Case A

Figure 21:
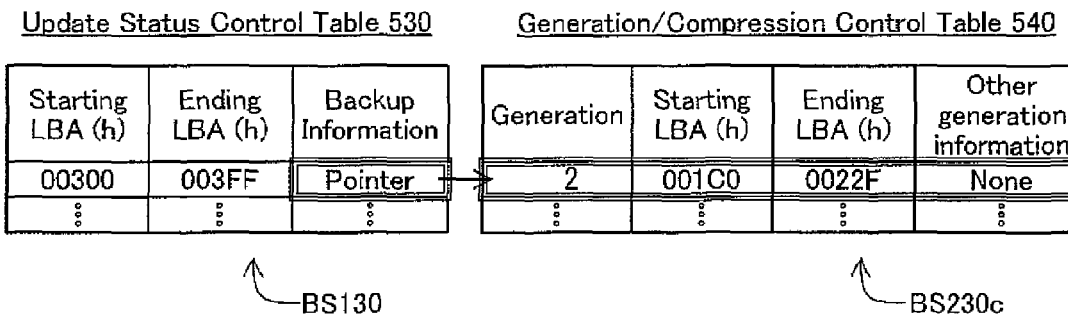
FIG. 21 is a drawing showing an example of the update status control table 530 and the generation/compression control table 540 in Case A.

FIG. 21 is a drawing showing an example of the update status control table 530 and the generation/compression control table 540 in Case A. In FIG. 21, a part of the content of tables 530 and 540 is shown after Step S7 in FIG. 14.

In Step S510 (FIG. 20), the data relay module 600b uses the new data obtained from the host computer 110 to generate compressed data for the specified block set. In this case, the data for all blocks in a single specified block set is obtained in the same way as in the procedures in Steps S300 through S325 in FIG. 9. After obtaining the data for all of the blocks, the data relay module 600b compresses the data in the data compression circuit 310 (FIG. 1) and stores (backups) the compressed data in the first logical volume LDEV1. According to FIG. 21, the post-compression data is stored in block set BS230c. At this time, the original data in the 0th logical volume LDEV0 is not updated.

In the next step, S513, the data relay module 600b adds, to the generation/compression control table 540, data regarding the backup destination block set BS230c in which the new post-compression data has been stored. According to FIG. 21, the generation is "2," the starting LBA is "001 C0(h)," the ending LBA is "0022F(h)" and the other generation information is "none." The generation is set to the generation specified by the host computer 110.

In the next step, S516, the data generation module 600b updates the update status control table 530. Specifically, a pointer is added to the specified block set backup information. This pointer references information pertaining to the backup destination block set in the generation/compression control table 540.

Once the processes described above have been completed, the data relay module 600b has completed the process of writing to an earlier generation in Case A.

B4. Case B

Figure 22:
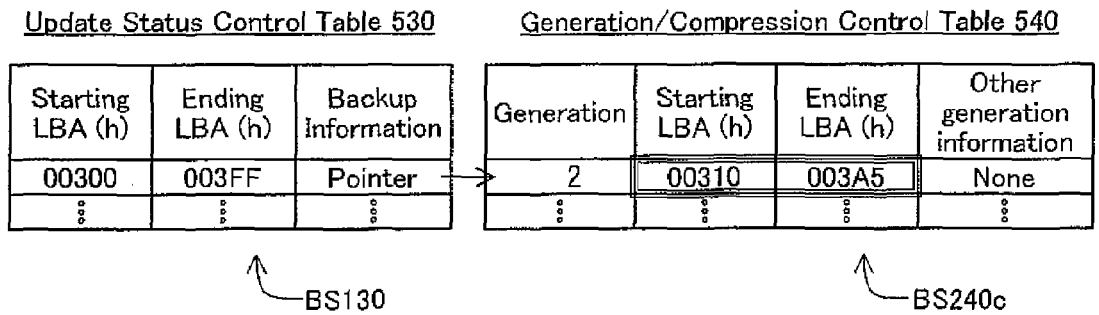
FIG. 22 is a drawing showing an example of the update status control table 530 and the generation/compression control table 540 in Case B.

FIG. 22 is a drawing showing an example of the update status control table 530 and the generation/compression control table 540 in Case B. FIG. 22 shows an example of the case wherein, following Step S7 in FIG. 14, the host computer 110 performs a write request, for the same specified generation, of the same specified block set, as in Step S7.

In Step S520 (FIG. 20) the data relay module 600b generates the data for the specified generation using the new data obtained from the host computer 110, and stores (backs up) the data for the specified generation to the first logical volume LDEV1. This process is the same as the process in Step S510, described above. However, the data for the blocks that are not specified, within the specified block set, are readout from the backup-destination block set in the first logical volume LDEV1, rather than the 0th logical volume LDEV0. This backup-destination block set is the block set associated with the specified generation. The data relay module 600b obtains the backup-destination block set by referencing the pre-update generation/compression control table 540.

Moreover, the data relay module 600b selects, from the open logical blocks in the first logical volume LDEV1, the logical block wherein to store the new post-compression data for the specified generation. According to FIG. 22, the block set BS240c is selected. However, if the new post-compression data for the specified generation is smaller than the old (previously backed up) post-compression data for the specified generation, then it is preferable to store the new data for the specified generation to the logical block wherein the old data for the specified generation had been stored.

In the next step, S525, the data relay module 600b updates the generation/compression control table 540. Specifically, the information for the backup-destination block set is replaced with the information for the block set wherein the new post-compression data is stored. According to FIG. 22, the starting LBA is updated to "00310(h)," and the ending LBA is updated to "003A5(h)."

Once the processes described above have been completed, then the data relay module 600b has completed the process of writing to a previous generation in Case B.

B5. Case C

Figure 23:
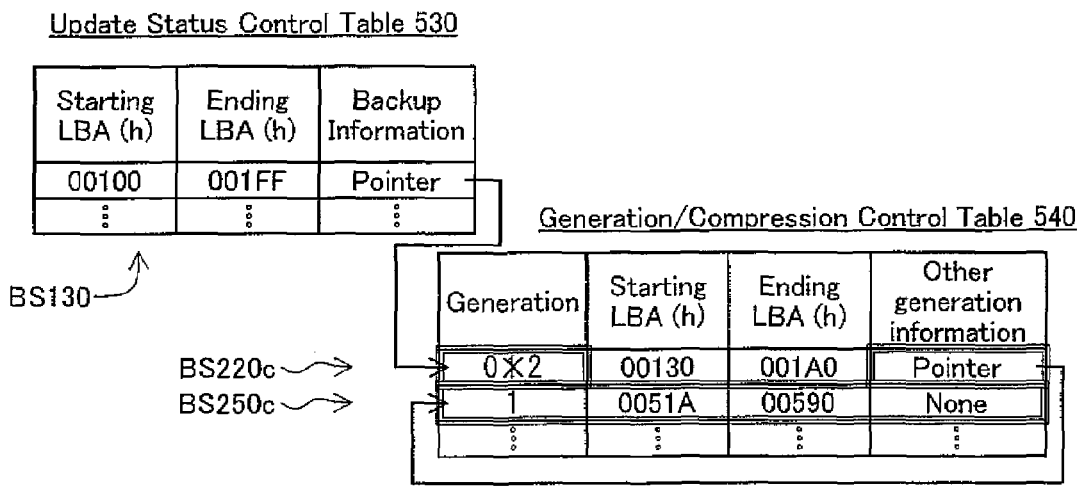
FIG. 23 is a drawing showing an example of the update status control table 530 and the generation/compression control table 540 in Case C.

FIG. 23 is a drawing showing an example of the update status control table 530 and the generation/compression control table 540 in Case C. FIG. 23 shows an example of the case wherein, following Step S7 in FIG. 14, the host computer 110 then performs a write request for the first generation LBA "00100(h)." As is shown in tables 530 and 540 in FIG. 14, backups have already been completed for the data for generations 0 through 2, in the block set BS220c, for the block set BS110, which includes "00100(h)." According to FIG. 23, a host computer 110 requests the writing of new data to only the first generation.

In Step S530 (FIG. 20), the data relay module 600b generates the data for the specified generation using the new data obtained from the host computer 110, and then stores (backs up) the data for the specified generation to the first volume LDEV1. This process is the same as the process in Step S520, described above. However, the new data is written to the open logical blocks while maintaining the data in the block set for which the backup has already been completed. According to FIG. 23, the new post-compression data is stored to the open block set BS250c while maintaining the data in the block set BS220c for which the backup has already been completed.

In the next step, S535, the data relay module 600b updates the generation/compression control table 540. Specifically, the specified generation is deleted from the information for the block for which the backup has already been completed, and information is added regarding the backup-destination block set wherein the new post-compression data is stored. According to FIG. 23, the specified generation (1) is deleted from the generation information for the block set BS220c, and information is added regarding the new block set BS250c. The generation is the same as the specified generation, (1) where the starting LBA is "0051A(h)," and the ending LBA is "00590(h)." Moreover, a pointer is added to the other generation information of the block set for which the backup has been completed. This pointer references information regarding the block set BS250c.

Once the processes described above have been completed, then the data relay module 600b has completed the write process to a past generation in Case C.

In the second embodiment, described above, the storage system 200b stores the post-update data while backing up the pre-update data, so it is possible to provide easily both the most recent data and the data for a specified point in time. Moreover, the disk array control unit 300b (FIG. 13) performs this backup process independently from the host computer 110, making it possible to perform the backup without applying a load to the host computer 110.

Furthermore, in the second embodiment, the data for the logical volume is divided over a plurality of block sets, and the pre-update data is backed up only for those block sets that are updated. The result is that it is possible to conserve the storage area, when compared to the case wherein the entirety of the logical volume is copied. Moreover, because the pre-update data is compressed and then stored, it is possible to conserve the storage area even further.

Furthermore, in the second embodiment, the storage system 200b not only stores the control data regarding the correspondence relationships between the pre-compression (pre-backup) and post-compression (post-backup) (i.e., the logical volume control table 510, the volume status control table 520, the update status control table 530, and the generation/compression control table 540), but also performs data compression and decompression, and updating of the control data, independently from the host computer 110. As a result, it is possible to perform the compression and decompression of the data without applying a load to the host computer 110.

In particular, in the second embodiment, the correspondence relationships between the pre-compression and post-compression block sets (the pre-backup and post-backup block sets) are defined by a combination of the update status control table 530 and the generation/compression control table 540. The result is that the disk array control unit 300b is able to receive a data transfer request, from the host computer 110, specifying pre-compression (pre-backup) LBAs in a consistent manner. Moreover, even when data is shared by a plurality of host computers, the disk array control unit 300b is able to receive data transfer requests using shared pre-compression (pre-backup) LBAs. In other words, the storage system 200b is "host transparent."

Furthermore, in the second embodiment, the disk array control unit 300b stores the correspondence relationship between the block sets and the generations in the generation/compression control table 540. Consequently, the disk array control unit 300b is able to receive, from the host computer 110, data transfer requests that specify the generation.

Furthermore, in the second embodiment, the storage system 200b stores the newest data without compression, making it possible to suppress any decrease in processing speed when the newest data is read out.

Note that in the second embodiment, the logical volume control table 510, the update status control table 530, and the generation/compression control table 540, as a whole, correspond to the "block correspondence relationships" in the present invention.

C. Third Embodiment

Figure 24:
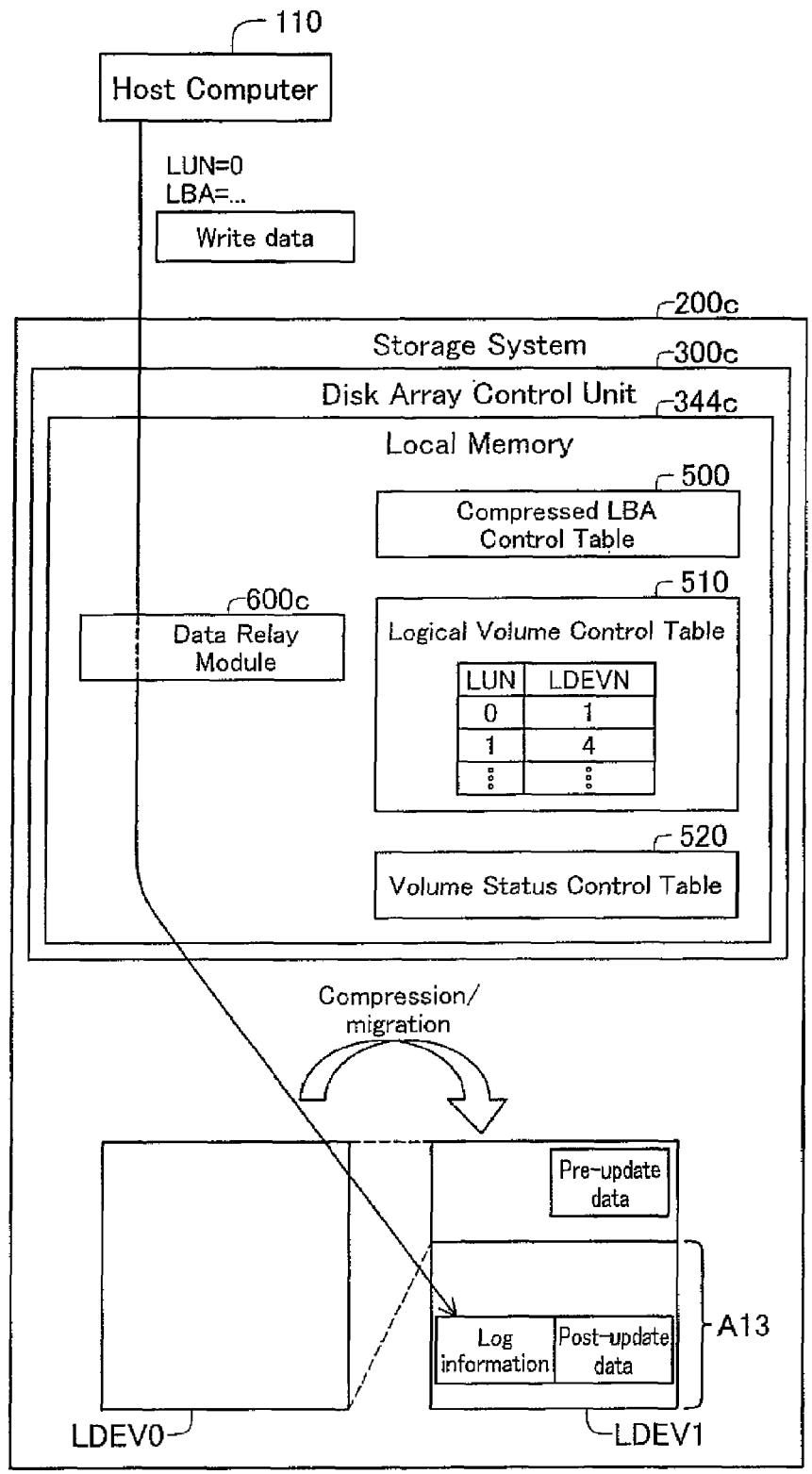
FIG. 24 is a drawing showing the structure of a storage system 200c in a third embodiment.

FIG. 24 is a drawing showing the structure of a storage system 200c in a third embodiment. The difference from the storage system 200 shown in FIG. 1 is that the data relay module 600c controls data updating after the compression/migration process by using a log method. The other structures are the same as for the storage system 200 shown in FIG. 1 and FIG. 2. Note that in FIG. 24, only the local memory 344c of the disk array control unit 300c is shown as a structural element of the storage system 200c, and the other structural elements are omitted from the figure.

The data relay module 600c performs a compression/migration process. The details of the compression/migration process are the same as in the first embodiment, shown in FIGS. 3 through 6.

C1. Write Process

Figure 25:
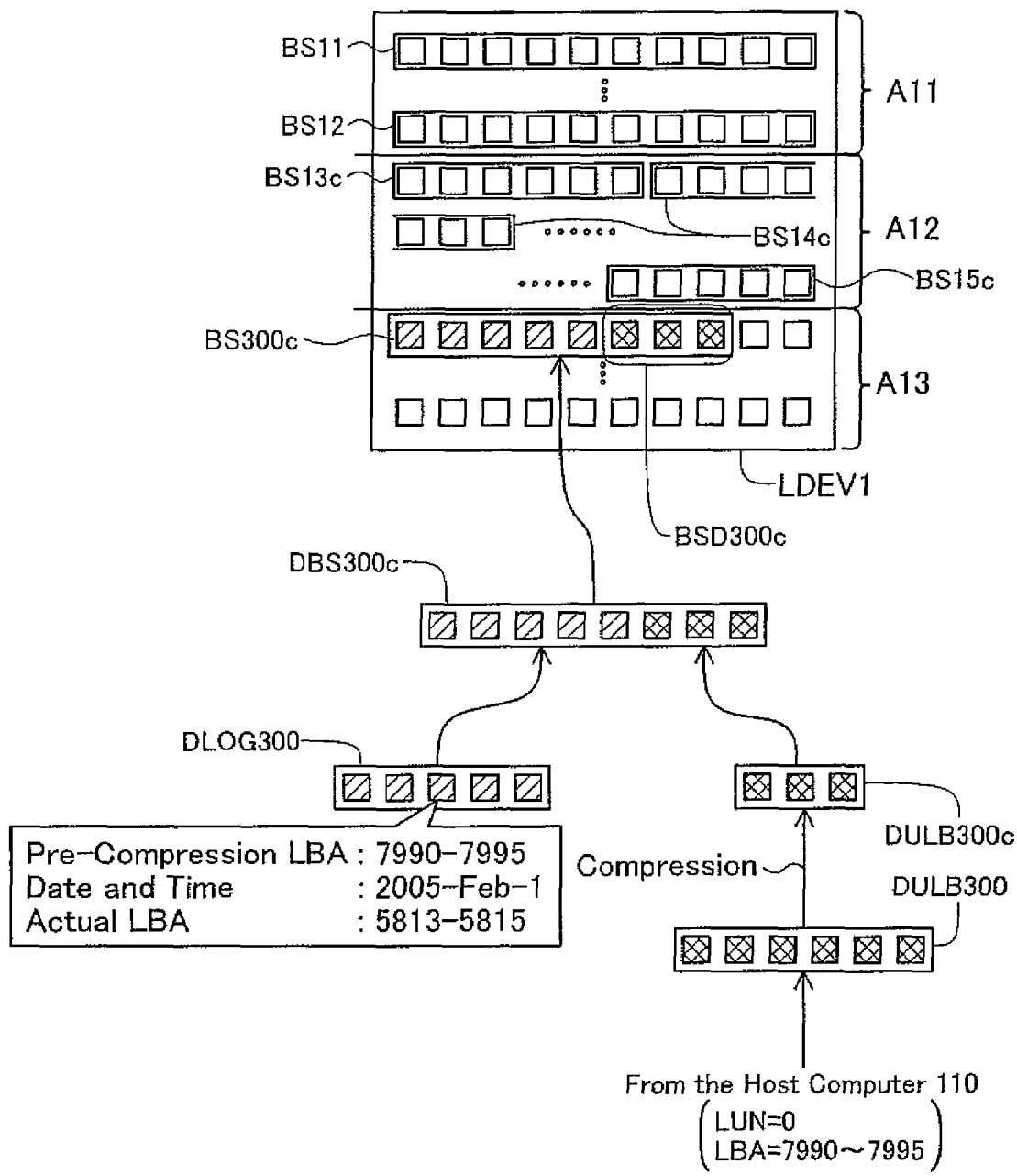
FIG. 25 is a drawing showing an overview of the write process in the third embodiment.

FIG. 25 is a drawing showing an overview of the write process in the third embodiment. This write process is a process following the compression/migration. Here the specified LBAs are "7990" through "7995."

The data relay module 600c compresses the new data DULB300, obtained from the host computer 110, in the data compression circuit 320 (FIG. 1). The data compression circuit 320 generates the post-compression data DULB300c through compressing the new data DULB300.

Moreover, the data relay module 600c generates log information DLOG300 associated with the post-compression (post-update) data DULB300c. This log information DLOG300 includes the pre-compression LBAs (specified LBAs), the actual LBAs that identify the block set wherein the post-compression data DULB300c is stored, and the date and time on which the data was written.

Next the data relay module 600c stores the log information DLOG300 and the post-compression data DULB300c into an unused area in the open area A13. In this way, the log information DLOG300 is stored in the logical volume in the same manner as is the data. However, as the method of storing the log information, a method is employed, wherein it is possible to distinguish between the block storing the log information DLOG300 and other blocks. A variety of well-known methods may be used as this type of storage method. For example, a method may be used wherein data that would not be found in other blocks is stored at the beginning block and end block for the log information DLOG300.

Note that the log information DLOG300 and the post-compression data DULB300c may be stored in different logical volumes.

Note that According to FIG. 25, the data DBS300c, together with the log information DLOG300 and the post-compression data DULB300c is stored in the block set BS300c. The post-compression data DULB300c is stored in the data block set BSD300c, within the block set BS300c. The actual LBAs for the log information DLOG300 show the LBAs for this data block set BSD300c.

In this way, the data relay module 600c adds post-update data and log information to the open area A13 each time a write request is received from the host computer 110.

Note that the block set identified by the actual LBAs (the post-compression block set) includes the data of each of the blocks in the block set identified by the pre-compression LBAs (the pre-compression block set). Consequently, the post-compression block set can be said to be associated with each of the blocks of the pre-compression LBAs. This point is similar for the other examples of embodiments as well. Moreover, in the third embodiment the number of blocks in the pre-compression block set is a number that varies according to the write request from the host computer 110.

C2. Read Process

The data relay module 600c performs data transfers in the same manner as in the first embodiment in FIGS. 7 and 8, in response to a read request from the host computer 110. However, the data relay module 600c looks up, from the log information in the open area A13, the log information containing the specified LBA (hereinafter termed the "specified log information"). After the specified log information is found, the data relay module 600c reads the data from the block set indicated by the actual LBAs in the specified log information, and decompresses the data that has been read in the data decompression circuit 330 (FIG. 1). The data relay module 600c uses the data that has been generated by the decompression to send the data for the specified LBAs to the host computer 110.

Note that the data relay module 600c uses the log information with the most recent write date and time when a plurality of specified log information has been found. Moreover, the data relay module 600c can receive, from the host computer 110, read requests specifying a past date and time. In this case, the newest specified log information at the specified date and time is used. In other words, from all of the log information since the specified date and time, the log information that is the newest is looked up. In this way, the "date and time" corresponds to the "a version" in the present invention.

Given the third embodiment, described above, the storage system 200c stores the post-update data while still leaving the pre-update data behind, thus making it possible to provide easily the newest data and the pre-update data. Moreover, because the post-update data is compressed and stored, it is possible to conserve the storage area.

Furthermore, in the third embodiment, the disk array control unit 300c not only stores log information regarding the updating and compression of data, but also performs the data compression and decompression independently from the host computer 110. Consequently, it is possible to perform the data compression and decompression without putting a load on the host computer 110.

In particular, in the third embodiment, the correspondence relationship between the pre-update and post-update block sets is established by the log information. As a result, the disk array control unit 300c is able to receive, in a consistent manner, data transfer requests from the host computer 110 specifying the pre-update (pre-compression) LBAs.

Note that in the third embodiment, the compressed LBA control table 500, the logical volume control table 510, and the log information, as a whole, corresponds to the "block correspondence relationships" in the present invention.

Moreover, the local memory 344c wherein this information is stored, and the migration-destination logical volume LDEV1 (or in other words, the disk array 250), as a whole, correspond to the "correspondence relationship memory unit" in the present invention.

D. Variants

Note that the present invention is not limited to the examples of embodiments or forms of embodiments described above, but rather can be embodied in a variety of forms in a range that does not deviate from the spirit of the present invention, and, for example, the following alternative forms are also possible.

Variant 1:

In the compression/migration processes shown in FIGS. 3 through 6, the logical volume for the migration destination may be the same as the logical volume for the migration origin. In this case, the post-compression data may overwrite the logical blocks wherein the pre-compression data has been stored.

Variant 2:

In the first embodiment shown in FIG. 4 and FIG. 8, the reading and writing of data is preformed using the block set as the unit for the non-compressed area A11 as well; however, the reading and writing may be performed using a single logical block as the unit. This is also true for the other processes and other examples of embodiments as well.

Variant 3:

In the first embodiment as shown in FIG. 6, the size of the unit for the compression process is fixed at "10 blocks." Consequently, it is possible to identify the block set by identifying the starting LBA for a pre-compression block set. Given this, the pre-compression size data may be omitted in the compressed LBA control table 500. Furthermore, when it comes to the non-compressed area A1 (or the non-compressed area A11), the pre-compression (pre-migration) LBAs and the post-compression (post-migration) LBAs are identical, and so data regarding the non-compressed area A1 (non-compressed area A11) in the compressed LBA control table 500 may be omitted. On the other hand, even in the second embodiment according to FIG. 14, the size of the compression processing unit is fixed at "100 (h)" blocks. Consequently, the ending LBA data may be omitted from the update status control table 530. Note that when it comes to post-compression block set, the size is variable, and so the size data or the ending LBA data should be used, without omission.

Moreover, in the first embodiment and in the second embodiment, the sizes of the units for the compression processing may be variable. For example, the size of the compression processing unit may vary depending on the location within the storage area.

Moreover, According to FIG. 6 (B), the enabling/disabling of compression and the compression algorithm is set for each logical volume; however, any unit desired can be used as a unit for setting up the enabling/disabling of the compression or setting up the compression algorithm. For example, the compression and the algorithm may be set up for each individual logical block, may be set up for each individual RAID group, or the same settings may be used for the storage system as a whole. In any case, a settings memory unit (such as a memory unit 340 or the disk array 250) should be provided in the storage system, and the details of the settings should be stored in advance for each of the set up units. This is not limited to the case wherein compression processing is performed, but is also true for cases wherein other processes (such as encryption processes) are performed.

Variant 4:

In the second embodiment, described above, the pre-update data is compressed and backed up (stored); however, the post-update data may be compressed and backed up (stored) instead. In this case, the information about the block set wherein the post-update data has been stored may be stored in the compression control table 540, in the same manner as according to FIG. 14.

Variant 5:

In the third embodiment, shown in FIG. 24 and FIG. 25, a compression/migration process is performed; however, this process need not be performed. Even in this case, the post-update data may be compressed and stored along with the log information. In this case, the post-update data and the log information may be stored to a logical volume that is different from the logical volume for the original data.

Furthermore, even in the third embodiment, the compressing and storing of the post-update data may be performed for each block set of a specific size, in the same manner as is done in the second embodiment.

Furthermore, even in the third embodiment, a point-in-time copy may be saved. For example, only the post-update data immediately prior to the specified point in time may be saved as the post-update data for each pre-compression LBA, while the other post-compression data may be destroyed.

Variant 6:

In each of the examples of embodiments described above, when data is read to the host computer 110 from the storage system 200, 200*b*, or 200*c*, the data for the specified LBAs, read out from the logical volume, may be stored temporarily in a cache memory 342, and then later gathered and sent to the host computer 110. Similarly, when writing data from the host computer 110 to the storage system 200, 200*b*, or 200*c*, the data sent from the host computer 110 may be stored temporarily in the cache memory 342, and then, after a notification of data writing completion has been sent to the host computer 110, actually be written to the logical volume.

Variant 7:

In each of the examples of embodiments described above, the LBAs specified by the host computer (i.e., the "specified LBAs"), and the LBAs (hereinafter termed "the physical LBAs") on the logical volume prior to compression (or prior to migration or prior to backup) are identical; however, they need not be identical. In such a case, a settings memory unit (for example, a memory unit 340 or disk array 250) should be provided in the storage system, and the LBA correspondence relationships between the specified LBAs and the physical LBAs should be stored in the settings memory unit.

Moreover, in each of the examples of embodiments described above, the sizes of the minimum units for data transfer between the disk array control units 300, 300*b*, or 300*c* and the host computer 110 (hereinafter termed the "host blocks") is the same as the sizes of the minimum units for data transfer within the logical volumes (hereinafter termed the "volume blocks"). However, the size of the Host blocks may be different from the size of the volume blocks. For example, the size of the volume blocks may be set to a value that is smaller than the size of the host blocks (for example, 1/L times the size of the host blocks, where L is an integer equal or greater than 2). Doing so makes it possible to prevent the storage area used in storing data from becoming excessively large when the size of the data is changed by the data conversion process, because a single host block is represented by multiple volume blocks.

Note that in this case, the structural information that indicates the correspondence relationships between the host blocks and the volume blocks should be stored in the settings memory unit of the storage system. Doing so makes it possible for the disk array control unit to reference the structural information in order to restructure the host blocks from the volume blocks. The correspondence relationships, for example, between the host block LBAs and the LBAs of the volume blocks that structure those host blocks, may be used as structural information.

Note that this type of LBA correspondence relationship, the structural information, and the tables 500, 510, 520, 530, and 540, described above, may be stored in any given memory unit in the storage system. For example, these may be stored in the local memory (for example, the local memory 344 (FIG. 1)) or a cache memory (for example, the cache memory 342), or may be stored in a disk array (for example, the disk array 250).

Variant 8:

In each of the examples of embodiments described above, the storage system 200, 200*b* or 200*c* may provide logical volumes to a plurality of host computers. In such a case, a logical volume control table 510 (FIG. 6 (C)) should be provided for each host computer. Here data transfer should be prohibited between a host computer and any logical volume not recorded in the logical volume control table 510 used by that host computer. Doing so makes it possible to prevent data transfer with an unintended host computer.

Variant 9:

Although in each of the examples of embodiments described above, a method that uses the RAID system is used as the method for forming a logical volume; however, other methods may be used instead. For example, the storage area provided by a single disk device may be used as is as a single logical volume.

Furthermore, the storage area is not limited to that uses a disk device, but any other storage area may be used instead. For example, a storage area that uses semiconductor memory may be used.

Variant 10:

In each of the examples of embodiments described above, a data compression process is performed; however, the data conversion process may use any given process that converts the size of the data itself. For example, an encryption process may be used instead. As the encryption process, any of a variety of well-known processes, such as DES encryption processing, may be used. Moreover, when using a password-protected encryption process, the password should be specified by the control terminal 120 or by the host computer 110. Furthermore, both compression processing and encryption processing may be performed.

Variant 11:

In each of the examples of embodiments described above, a portion of structures embodied in software may be replaced into hardware, and, conversely, a portion of the structure that is embodied in hardware may be replaced by software. For example, the functions of the data compression unit 320 (FIG. 1) and the data decompression unit 330 may be embodied in a program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage system independent from a host computer comprising:
    a first logical volume to store data; and
    a control unit to migrate/compress data of the first logical volume having determination of whether a series of processes is necessary to be performed with a lookup of a LBA control table which indicates correspondence relationship between pre-migration/pre-compression and post-migration/post-compression, wherein
    the control unit includes a data conversion unit to compress and/or encrypt a first block set including N first blocks received from the host computer to a second block set including at least one second block to store the second block set in the first logical volume,
    N is an integer greater than or equal to 1, and
    when the control unit receives a write request for updating at least one of the N first blocks in the first block set, the control unit reads the second block set, decompresses the second block set to the first block set, generates an updated first block set by combining the at least one of the N first blocks with write data received according to the write request, compresses the updated first block set to an updated second block set, and stores the updated second block set in a storage area different from a storage area storing the second block set in the first logical volume.

2. The storage system according to claim 1, wherein
    when the control unit receives a write request for updating all of the N first blocks in the first block set, the control unit converts an updated first block set including N first blocks received according to the write request to an updated second block set, and stores the updated second block set in a storage area different from a storage area storing the second block set in the first logical volume.

3. The storage system according to claim 1, wherein the control unit stores the LBA control table that indicates relationship between a plurality of the first block sets and a plurality of the second block set.

4. The storage system according to claim 1, comprising
    a second logical volume that is different from the first logical volume storing the second block set, wherein
    the control unit stores the updated second block set in the second logical volume.

5. The storage system according to claim 1, wherein
    when the updated second block set is smaller than the second block set, the control unit stores the updated second block set in the storage area storing the second block set in the first logical volume.

6. A method of a storage system migrating data comprising:
    migrating/compressing, via a control unit, a first block set including N first blocks received from an independent host computer to a second block set including at least one second block to store the second block set in a first logical volume, N being an integer greater than or equal to 1; and
    responsive to a write request for updating at least one of the N first blocks in the first block set:
    determining whether a series of processes is necessary to be performed with a lookup of a LBA control table which indicates correspondence relationship between pre-migration/pre-compression and post-migration/post-compression, wherein the series of processes comprising:
    reading the second block set;
    decompressing the second block set to the first block set;
    generating an updated first block set by combining the at least one of the N first blocks with write data received according to the write request;
    compressing the updated first block set to an updated second block set; and
    storing the updated second block set in a storage area different from a storage area storing the second block set in the first logical volume.

7. The method according to claim 6, comprising:
    responsive to a write request for updating all of the N first blocks in the first block set:
    converting an updated first block set including N first blocks received according to the write request to an updated second block set; and
    storing the updated second block set in a storage area different from a storage area storing the second block set in the first logical volume.

8. The method according to claim 6, comprising: storing the LBA control table in a memory, the LBA control table indicating relationship between a plurality of the first block sets and a plurality of the second block sets.

9. The method according to claim 6, wherein
    the storing of the updated second block set includes:
    storing the updated second block set in a second logical volume that is different from the first logical volume storing the second block set.

10. The method according to claim 6, wherein
    the storing of the updated second block set includes:
    storing the updated second block set in the storage area storing the second block set in the first logical volume when the updated second block set is smaller than the second block set.

\* \* \* \* \*